US011491448B2

(12) United States Patent
Laoui et al.

(10) Patent No.: US 11,491,448 B2
(45) Date of Patent: Nov. 8, 2022

(54) HYBRID MEMBRANE AND METHOD FOR SEPARATING OIL AND WATER

(71) Applicant: King Fahd University of Petroleum and Minerals, Dhahran (SA)

(72) Inventors: Tahar Laoui, Dhahran (SA); Noman Naseeb, Dhahran (SA); Mohammed Abdul Azeem, Dhahran (SA); Zafarullah Khan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/229,604

(22) Filed: Dec. 21, 2018

(65) Prior Publication Data
US 2020/0197878 A1 Jun. 25, 2020

(51) Int. Cl.
*B01D 71/02* (2006.01)
*B01D 61/02* (2006.01)
(Continued)

(52) U.S. Cl.
CPC ......... *B01D 71/021* (2013.01); *B01D 61/027* (2013.01); *B01D 67/0079* (2013.01); *B01D 71/024* (2013.01); *B01D 71/42* (2013.01)

(58) Field of Classification Search
CPC .. B01D 61/027; B01D 71/42; B01D 67/0079; B01D 69/148; B01D 67/0004;
(Continued)

(56) References Cited

U.S. PATENT DOCUMENTS

2016/0310908 A1* 10/2016 Yu .................. B01D 61/243
2017/0206997 A1* 7/2017 Al-Harthi ............ H01B 1/24

FOREIGN PATENT DOCUMENTS

| CN | 106058270 A | 10/2016 |
|---|---|---|
| CN | 106207124 A | 12/2016 |
| CN | 104674384 B | 10/2017 |

OTHER PUBLICATIONS

Laoui, et al. ; Development and Characterization of Electrospun Polyacrylonitrile-Based Nanocomposite Membranes for Oil-Water Separation ; Masters Thesis ; 033/27/2018 ; Abstract Only ; 2 Pages.
(Continued)

*Primary Examiner* — Vishal V Vasisth
(74) *Attorney, Agent, or Firm* — Oblon, McClelland, Maier & Neustadt, L.L.P.

(57) ABSTRACT

A hybrid membrane, particularly of polyacrylonitrile (PAN)/graphene oxide (GO)/SiO$_2$, separates oil and water even from emulsions. The membrane can be made by one-step electrospinning, adding GO and SiO$_2$ nanofillers in PAN in various concentrations. The nanofillers may be uniformly embedded in the nanofibrous structure of the electrospun hybrid membrane, with GO mainly embedded inside the PAN nanofibers and may cause knots, and/or SiO$_2$ nanoparticles embedded on the nanofiber surface and may form micro-nano fiber surface protrusions. Hierarchical structures formed can have enhanced hydrophilicity due to oxygen-containing groups on both SiO$_2$ and GO, and have >99% oil rejection from oil-water emulsions. Separation flux and phase rejection of gravity separation may be enhanced by incorporation of nanofillers, which may also enhance membrane mechanical properties. Separated water flux may be enhanced from 2600 (pure PAN) to 3151 Lm$^{-2}$h$^{-1}$ for the hybrid.

13 Claims, 14 Drawing Sheets

(51) Int. Cl.
*B01D 71/42* (2006.01)
*B01D 67/00* (2006.01)

(58) Field of Classification Search
CPC .... B01D 69/02; B01D 71/024; B01D 71/021; B01D 2323/39; B01D 71/40; B01D 71/027; B01D 2325/28; C02F 1/00
See application file for complete search history.

(56) References Cited

OTHER PUBLICATIONS

Liu, et al. ; Influence of graphene oxide sheets on the pore structure and filtration performance of a novel graphene oxide /silica / polyacrylonitrile mixed matrix membrane ; Journal of Materials Science vol. 53, Issue 9 ; pp. 6505-6518 ; May 2018 ; 10 Pages.
Dastbaz, et al. ; Fabrication of Polyacrylonitrile/Silica Electrospun Nanofibrous Membranes for Water Filtration ; Membrane Science and Technology ; Nov. 1-3, 2015 ; 4 Pages.
Kim, et al. ; The formation of silica nanoparticles on the polyacrylonitrile-based carbon nanofibers by graphene via electrospinning ; ScienceDirect ; Material Letters vol. 71, Issue 15 ; pp. 74-77 ; Mar. 15, 2012 ; Bstract Only ; 2 Pages.

\* cited by examiner

HYBRID MEMBRANE AND METHOD FOR SEPARATING OIL AND WATER

An abstract to a master's thesis and the master's thesis entitled, "Development and Characterization of Electrospun Polyacrylonitrile-Based Nanocomposite Membranes for Oil-Water Separation," at King Fahd University of Petroleum and Minerals, College Of Engineering Sciences, Department of Mechanical Engineering by Noman Naseeb were published on Mar. 27, 2018. This thesis is incorporated herein by reference in its entirety.

STATEMENT OF ACKNOWLEDGEMENT

The inventors thank and acknowledge the Deanship of Scientific Research at King Fand University of Petroleum and Minerals, Saudi Arabia for supporting and funding this work through project number IN151018.

BACKGROUND OF THE INVENTION

Field of the Invention

This application relates to membranes and methods for separating mixtures of water and oil, particularly emulsions.

Description of the Related Art

Many branches of industry, including oil, gas, textile, food, chemical, and metal processing, generate large amounts of waste fluids, particularly mixed oil and water. Fluids that are contaminated mixtures of, e.g., oil and water, are often discharged into water bodies potentially causing environmental harm. Oil contamination can be broadly classified as free, dispersed, and emulsified oil, with these categories primarily differing by their oil droplet size. Among these, emulsions, with average droplet sizes of less than 20 micron, are the most stable and are the most difficult to separate (demulsify).

Conventional techniques, such as gravity settling, coagulation, flotation, flocculation, ozonation, and chemical methods have been found insufficiently effective for treating such oily water mixtures, particularly on industrial scale, due to high operational costs and problems including secondary pollutants as by-products. Among many other oil-water separation techniques, membrane base separation technology has shown promise for its versatility, simplicity, operational efficiency, and environmental friendliness.

Various methods, such as phase inversion, coating, sol-gel, and electrospinning, have been used to produce membranes useful for these separations. Among these membrane manufacturing methods, electrospinning offers a simple and efficient process to make highly porous polymer based membranes with desirable surface chemistry and high permeation rate. Two types of membranes are generally considered for oil-water separation: (1) hydrophobic-oleophilic and (2) hydrophilic-oleophobic. Hydrophobic-oleophilic membranes allow oil to pass through the resulting in degraded membrane performance and limited reusability. Reusability limitations of oil-water separation membranes are a major concern, hindering more widespread commercial viability. Additionally, the available membranes frequently become brittle when exposed to oily water, further limiting their reuse.

Attempts to address further problems, e.g., fouling, of hydrophilic-oleophobic membranes remain of research interest, particularly where high hydrophilicity together with hierarchical surface morphology causes water to pass through the membrane providing a high water flux with oil repelling over the fiber surface. These and other issues of such membranes have therefore been the subject of research.

CN 104674384 B (Zhong) describes a three-dimensional oil water separation material based on electrostatic spinning technology, and preparation method thereof, for water treatment. Zhong's method involves: a) preparing electrostatic spinning solution; b) selecting a suitable solvent to directly receive the electrospun nanofibers, and obtain a nanofiber solution; c) freezing and shaping of the nanofiber solution, then putting it in a freeze dryer to obtain three-dimensional (3D) nanofiber; d) pre-oxidizing, carbonizing, and activating the 3D nanofiber to obtain a 3D carbon nanofiber; e) covering the 3D carbon nanofiber with coating to give an oleophilic, hydrophobic layer, and thereby the 3D oil water separating material.

However, although Zhong discloses using carbon nanotubes, graphene oxide, graphene, nanoparticles, or nanoparticle precursors, Zhong does not specifically describe an advantage to using graphene oxide, nor flakes or plates thereof. Zhong generally discloses optionally using any of polyacrylonitrile, polyamide, polycarbonate, polyurethane, polyurethane urea, polyvinyl chloride, polyvinylidene fluoride, polyethylene terephthalate, polybutylene terephthalate, polystyrene(s), polymethacrylic acid, polysulfone, polyethersulfone, and modified polymers thereof. However, Zhong does not specifically disclose selecting PAN, nor indicate combining each of PAN, graphene oxide (particularly flakes), and silica. In addition, Zhong requires a coating on a 3D network, such that the coating comprises, e.g., fluorine, silicon, and/or sulfur-containing polymers like-polydimethylsiloxane. Zhong does not teach the use of a PAN membrane with graphene oxide and silica nano-fillers.

CN 106058270 A (Wang) describes a porous carbon nanometer fiber-graphene composite material, and its preparation, for electrocatalytic oxidation reduction performance. Its method involves: electrospinning a $Fe(NO)_3.6H_2O$-polyacrylonitrile (PAN)-graphene oxide (GO)-$SiO_2$ precursor to give a nanometer fiber; removing $SiO_2$ with NaOH; finally, high-temperature carbonizing to obtain the porous carbon nanometer fiber-graphene composite material.

Wang's ultimate product does not contain silica, due to its base wash, and Wang's composite material is for use in catalysis, not in oil/water separation. In addition, Wang's composite material requires the use of a catalytic metal, particularly $Fe(NO_3)$. Wang does not teach the use of a PAN membrane with graphene oxide and silica nano-fillers, and particularly not for separation of oil from water/oil mixtures.

CN 106207124 A (Hu) describes an electrode material of a lithium ion battery, esp. a graphene-coated silicon-carbon composite nanofiber membrane and its application. Its graphene-coated, silicon-carbon composite nanofiber membrane comprises the silicon-carbon composite nanofiber membrane and a graphene layer for protecting the silicon-carbon composite nanofiber membrane. The surface of the silicon-carbon composite nanofiber membrane is coated with the graphene layer. The silicon-carbon composite nanofiber membrane comprises carbon nanofibers embedded with silicon nanoparticles. The silicon nanoparticles are irregularly embedded in the surfaces and interiors of the carbon nanofibers. The silicon-carbon composite nanofiber membrane surface is coated with the graphene layer.

Hu's electrode material is pre-heated at 240 to 320° C. and heat treated 600 to 800° C., presumably oxidizing any polymer component. Further, Hu's graphene oxide is coated on the outside of an oxidized, calcinated polymer-silica framework. Hu's system uses at least 20 wt. % and preferably at least 40 wt. %, relative to the total, of silica. Hu does not teach the use of a PAN membrane with embedded graphene oxide and silica nano-fillers, and particularly not for separation of oil from water/oil mixtures, nor one which has not been heat treated.

*J. Materials Sci.*, 2018, 53(9), 6505-6518 (Liu) describes a graphene oxide (GO)-silica ($SiO_2$)-polyacrylonitrile (PAN) mixed matrix membranes with high filtration flux and antifouling performance designed and fabricated in situ by non-solvent induced phase separation (NIPS) from the precursor of PAN hybridized with GO, tetraethoxysilane, and 3-aminopropyltriethoxysilane. Liu reports that in situ incorporation of GO sheets and $SiO_2$ molecules into PAN matrix via NIPS reconstructs the porous structure of derived $GO-SiO_2$-PAN mixed matrix membranes with the upright finger-like holes, porous bottom, thinner top layer and high porosity. The spontaneous surface migration or segregation of hydrophilic GO sheets and $SiO_2$ molecules as well as their interaction occurred during NIPS greatly ameliorate the top surface structure and property of derived membranes with smoother surface, uniform pore structure and good hydrophilicity. Liu's $GO-SiO_2$—PAN mixed matrix membranes exhibit a water filtration flux of 387 $Lm^{-2}h^{-1}$ with the bull serum albumin rejection rate up to 99% and antifouling performance.

However, Liu does not use a solvent-based impregnation of PAN fibers with silica or graphene oxide, and Liu does not describe a membrane with all of nano-sized silica, sub-micron-sized graphene, oxide, particularly flakes thereof, embedded in PAN fibers. In addition, Liu coats membrane fibers with tetraethoxysilane and 3-aminopropyltriethoxysilane (APTES).

The conference papers entitled "Fabrication of Polyacrylonitrile/Silica Electrospun Nanofibrous Membranes for Water/Oil Filtration" at the 12th International Conference on Membrane Science and Technology, published in 2015, (Dastbaz) describes preparing polyacrylonitrile (PAN) composite nanofibrous membranes with 1, 3, and 5% w/w content of modified silica nanoparticles in order to improve mechanical properties, thermal stability and water filtration performance for the possible application as water filtration membranes. Dastbaz explores the effects of nano particles and surface modification on the surface chemistry, structure, and performance of membranes, reporting that incorporating silica nanoparticles enhances the mechanical and thermal properties of its membranes. Dastbaz states that PAN-$SiO_2$ membranes showed excellent oil-water separation performance, while incorporating $SiO_2$ led to decrease in liquid entry pressure (LEP) and increase in water flux rate.

Dastbaz does not disclose the use of graphene in membranes, nor does Dastbaz suggest using more than 5 wt. % silica in its membranes. Dastbaz indicates poorer tensile strength and elongation at break for using more than 1 wt. % silica. Dastbaz does combine PAN fibers with embedded graphene oxide and silica nano-fillers.

*Mater. Lett.* 2012, 71, 74-77 (Kim) describes silica-carbon nanofiber (CNF) composites prepared with a graphene-polyacrylonitrile (PAN) solution containing tetraethoxysilane (TEOS) using electrospinning, followed by stabilization and carbonization. The graphene directly accelerates the formation and growth of nanosized silica particles on the fiber surface. The silica/CNF composites are characterized by SEM, TGA, FTIR spectra, a 29Si MAS-NMR spectrum, and the crystallite parameters. Kim's technology is applicable to prepare homogeneously dispersed nanosized metal-oxide particles on CNF composites.

However, Kim uses tetraethoxysilane in the preparation of a PAN-graphene oxide-silica membrane, and Kim also teaches a carbonization step, as Kim seeks to prepare an electro-conductive carbon structure. Kim does not combine PAN fibers with embedded graphene oxide and silica nano-fillers in a final product, instead appearing to eliminate the polymer structure beyond the carbon skeleton, and Kim appears to contain graphene oxide on fiber surfaces, rather than embedded in a PAN fiber, and surface-mounted graphene oxide serves as a nucleation point for inorganic, i.e., silica, crystal formation.

Accordingly, the provides a membrane hybrid material and related membrane useful in water filtration and/or water-oil separation, as well as alternate methods of preparing such hybrid materials, particularly PAN-graphene oxide-silica hybrid materials.

SUMMARY OF THE INVENTION

Aspects of the present disclosure provide membranes comprising: a electrospun polyacrylonitrile (PAN) nanofiber; graphene oxide; and silicon dioxide nanoparticles, wherein the graphene oxide is embedded in the PAN nanofibers optionally forming knots, and wherein the silicon dioxide nanoparticles are on a surface of the PAN nanofibers optionally forming micro-nano protrusions on the nanofiber surface. Any permutation of the features listed below, or distinguishing over the art above, may be used to modify such inventive membranes.

In embodiments the silicon dioxide nanoparticles may be in a range of from 5 to 10 wt. %, particularly 7.5 wt. %, relative to a total membrane weight, and/or the graphene oxide may be in a range of from 0.5 to 2.5 wt. %, particularly 1.5 wt. %, relative to a total membrane weight.

In embodiments the silicon dioxide nanoparticles may have an average diameter in a range of from 0.1 to 100 nm.

In embodiments at least a portion of the graphene oxide may be in flake form. The graphene oxide may be at least partially present in the form of flakes having an average longest dimension in a range of from 50 to 1250 nm. The flakes may have a ratio of thickness to the average longest dimension in a range of from 1:1000 to 1:5. The graphene oxide may have a carbon-to-oxygen ratio in a range of from 10:1 to 2:1.

In embodiments the PAN nanofiber may have a $M_w$ in a range of from 100,000 to 200,000 g/mol In embodiments membranes within the scope of the invention may have a water contact angle of no more than 10° and/or an underwater oil contact angle of at least 150° C. Additionally or separately, inventive membranes may have an average pore diameter in a range of from 0.9 to 1.40 µm. Additionally or separately, membranes within the scope of the invention may have an average fiber diameter in a range of from 250 to 450 nm.

Additionally or separately, membranes within the scope of the invention may have a tensile strength in a range of from 6.6 to 10.5 MPa; and/or an elongation at brake in a range of from 10 to 16%; and/or an elastic modulus in a range of from 110 to 145 MPa; and/or a water flux in a range of from 2750 to 3500 $Lm^{-2}h^{-1}$.

Aspects of the invention provide fluid filters, comprising one or more membranes in any permutation described herein.

Aspects of the invention provide methods of making the membrane in any permutation described herein, the method comprising: feeding a mixture of polyacrylonitrile, silica nanoparticles, and graphene oxide in a solvent through a feed syringe to obtain a fiber; and forming the fiber into a film.

Aspects of the invention provide methods of separating oil from an oil-water mixture or emulsion comprising: contacting the emulsion with one of more membranes in any permutation described herein; and separating at least part of the oil from the mixture or emulsion.

Aspects of the invention provide methods of making a hybrid membrane suitable for filtering a oil-water mixture, the method comprising: dissolving polyacrylonitrile in a solvent to form a solution; adding to the solution silica nanopowder with an average particle size in the range 5 to 20 nm; adding graphene oxide flakes having a length and/or width in a range of from 0.1 to 0.9 microns; stirring the solution for a time in the range of 6 to 18 hours; and electrospinning the solution at a voltage in the range of 10 to 30 kV to form the membrane.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
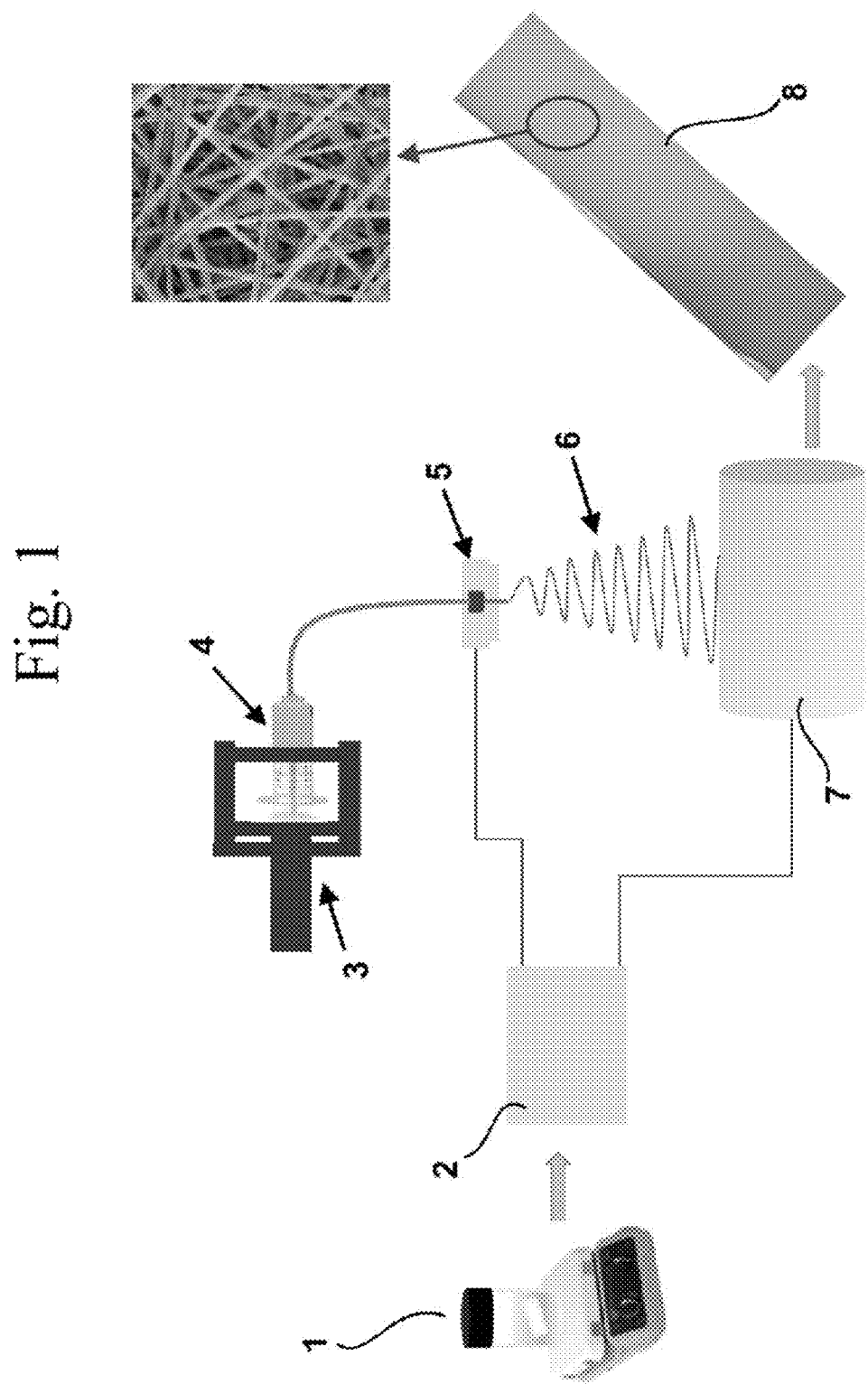
FIG. 1 shows a schematic of electrospinning and PAN based membrane fabrication.

Aspects of the invention provide membranes comprising: a electrospun polyacrylonitrile (PAN) nanofiber; graphene oxide; and silicon dioxide nanoparticles, wherein the graphene oxide is embedded in the PAN nanofibers optionally forming knots, and wherein the silicon dioxide nanoparticles are on a surface of the PAN nanofibers optionally forming micro-nano protrusions on the nanofiber surface.

Morphological phenomena may occur in the GO-doped nanofibers relative to pure PAN nanofibers, and in some embodiments these morphological aberrations may be the basis for unexpectedly good filtration properties. Accordingly, while not required for function, membranes within the scope of the invention may exhibit such morphologies. Knots may refer to morphologies visibly evident on the surface of the PAN fibers, which may be considered geometric deformations from a cylindrical, linear-surfaced structure. These knots may manifest as lumps on the surface or like a rounded, scaley string wrapped around the PAN cylinder, i.e., outgrowths greater in size than the pure PAN cylindrical string structure. The knots may be considered localized swelling features and/or bulges, which may appear as agglomerated scales, granite ridges, or the like. The knots can have a length (measured along the morphological aberration, or along the length of the PAN nanofiber) in a range of from 20 to 1000, 50 to 750, 75 to 500, or 100 to 400 nm, or any of these as a lower or upper end point, or at least 10, 25, 40, 60, 80, 125, or 150 nm, and/or no more than 1125, 900, 800, 725, 650, 550, or 450 nm. The height of the knots may be in a range of 10 to 75, 15 to 70, or 20 to 65% of the PAN diameter, or any of these endpoints, or at least 12.5, 17.5, 25, 33, or 40% of the PAN diameter, and/or no more than 95, 90, 85, 80, 72.5, 62.5, 60, 55, or 50% of the PAN diameter. The radial bulging from the PAN "cylinder" due to the graphene oxide may be up to 300, 275, 250, 225, 200, 175, 150, 125, or 100 nm. The width of the knots may be in a range of 5 to 50, 10 to 40, or 15 to 33% of the circumference of the PAN "cylinder."

The protrusions as recited in the claims may have similar size to the knots, but may derive from surface agglomerations of SiO$_2$ particles, with an appearance of amassed spheroids upon the surface of the PAN fiber "cylinder." The visible TEM image of the SiO$_2$ protrusions may have an appearance like cell masses, extended upon the PAN fiber, with irregular radial outcroppings. The outcroppings may be 0.25 to 0.33-fold the total radial height of the protrusions. The protrusions may be equal in length and/or to the knots, or no more than 75, 67, 50, 40, or 33% of the length and/or width of the knots. The protrusions may have a more bump-like morphology, rather than extending lengthwise (as may be the case for the knots). The protrusions and/or knots may be 10 to 50, 15 to 40, or 20 to 33% of the length of the PAN nanofiber length, i.e., are generally dispersed and/or not contiguous and/or discontinuous. Given that the protrusions may have shorter lengths than the knots, the protrusions may be more frequent morphologies on the PAN fibers, such as 1, 2, 3, or 4 per 5 microns, while the knots may manifest once or twice per 5 microns.

The PAN polymer may be a homopolymer, or may contain, for example, no more than 15, 10, 7.5, 5, 4, 3, 2, 1, 0.5, 0.1, 0.01, or 0.001 mol. % of one or more further monomers, such as styrene, acrylates, methacrylates (such as 2-ethylhexyl, isopropyl, ethyl, methyl, etc., methacrylate), butadiene, vinyl chloride, or the like. Although pure PAN is sufficient for most filtering applications presently contemplated, further useful polymers may include poly(styrene-co-acrylonitrile) (SAN), styrene, acrylonitrile and butadiene (ABS), acrylate-styrene-acrylonitrile (ASA), acrylonitrile-butadiene rubber (NBR), acrylonitrile-acrylate (ANA), methacrylate-acrylonitrile-butadiene-styrene (MABS), and the like.

The silicon dioxide nanoparticles may be in a range of from 5 to 10, 6 to 9, 7 to 8, or 7.5 wt. %, relative to a total membrane weight. The SiO$_2$ content may be generally preferably under 20, 17.5, 15, 12.5, or 10 wt. %. In addition or separately, the graphene oxide may be in a range of from 0.5 to 2.5, 0.75 to 2.25, 1 to 2, 1.25 to 1.75, 1.35 to 1.65, 1.4 to 1.6, 1.45 to 1.55, or 1.5 wt. %, relative to a total membrane weight. The graphene may be completely embedded into the polymer fibers, or have no more than 10, 5, 2.5, 1, 0.1, 0.01, or 0.001 wt. % exposed outside of the surface of the polymer. Embedded may mean herein, that the graphene oxide is surrounded by PAN polymer matrix entirely, i.e., with no GO penetrating the surface, or, for example, no more than 1, 2, 5, or 10 vol. % of the GO penetrating the PAN surfaces. It is believed advantageous that the graphene oxide is well-solubilized by the polymer matrix. The GO may be only "bound" to the polymer matrix by secondary forces, i.e., without covalent bonding. The solvent effect of the polymer matrix may be a force, or the only force, retaining the GO flakes.

The silicon dioxide nanoparticles may have an average diameter in a range of from 0.1 to 100, 0.5 to 75, 1 to 50, 5 to 25, 10 to 15, or 12 nm. In addition or separately, the graphene oxide may be at least partially present in the form of flakes having an average longest dimension in a range of from 50 to 1250, 100 to 1000, 200 to 900, 250 to 800, or 300 to 700 nm. The flakes may have a ratio of thickness to the average longest dimension in a range of from 1:1000 to 1:5, 1:500 to 1:10, 1:250 to 1:15, 1:125 to 1:20, or 1:75 to 1:25.

The graphene oxide may have a carbon-to-oxygen ratio in a range of from 10:1 to 2:1, 8:1 to 2.5:1, 6:1 to 3:1, 5:1 to 3.5:1, or 4:1. The carbon-to-oxygen ratio may be at least 2.5:1, 2.75:1, 3.1:1, 3.33:1, or 4:1.

The PAN nanofiber may have a $M_w$ in a range of from 100,000 to 200,000, 125,000 to 175,000, 135,000 to 165,000, 145,000 to 155,000, or 150,000 g/mol. The PDI of the polymer nanofiber may be at least 1.1, 1.2, 1.25, 1.3, 1.4, 1.5, 1.6, 1.75, 1.85, 2, 2.25, 2.5, 2.75, 3, 3.33, or 3.5, and or no more than 10, 8, 7.5, 6.5, 6, 5.5, 5, 4.5, 4.25, 4, 3.75, 3.5, 3.25, 3, 2.5, or 2.

Membranes within the scope of the invention may have a water contact angle of no more than 8, 9, 10, 11, or 12° and/or an underwater oil contact angle of at least 135, 140, 142.5, 145, or 150°. Inventive membranes may have an average pore diameter in a range of from 0.9 to 1.40, 1 to 1.375, 1.1 to 1.35, 1.2 to 1.325, 1.25 to 1.32, 1.275 to 1.31, 1.29 to 1.305, or 1.3 μm. Membranes within the scope of the invention may have an average fiber diameter in a range of from 250 to 450, 275 to 425, 300 to 400, 325 to 375, 333 to 367, 345 to 355, or 350 nm. The average fiber diameter, including any of these figures, may be ≥230, 280, 310, 320, 330, 340, or 350 and/or ≤467, 433, 410, 390, 385, 370, or 360.

Membranes within the scope of the invention may have a tensile strength in a range of from 6.6 to 10.5, 6.8 to 10.2, 7.0 to 10.0, 7.2 to 9.5, 7.3 to 9.0, 7.4 to 8.5, 7.5 to 8.0, or 7.7 to 7.9 MPa, or 7.8±0.3, 0.4, 0.5, 0.6, 0.7, 1, 1.5, 2, 2.5, 3, or 4 MPa; and/or an elongation at brake in a range of from 10 to 16, 11 to 15, 12 to 14.5, 13 to 14.33, 13.5 to 14.2, 13.7 to 14, or 13.8 to 13.95%, or 13.9±0.5, 1, 1.5, 2, 2.5, or 3%; and/or an elastic modulus in a range of from 110 to 145, 115 to 140, 120 to 135, 125 to 130, or 127 to 129 MPa, or 128±0.5, 1, 1.5, 1.8, 2, 2.2, 2.5, 3, 4, 5, or 10 MPa; and/or a water flux in a range of from 2750 to 3500, 2800 to 3333, 2900 to 3250, 3000 to 3175, or 3050 to 3150 $Lm^{-2}h^{-1}$, or at least 2775, 2825, 2875, 2925, 2950, 2975, 3025, 3067, 3075, 3100, 3125, or 3150 $Lm^{-2}h^{-1}$, possibly even up to 5000 $Lm^{-2}h^{-1}$ or more.

Aspects of the invention provide fluid filters, particularly liquid filters, particularly liquid filters suitable for handling aqueous mixtures, comprising one or more membranes in any permutation described herein. The filters may be present in a vehicle, such as an aircraft or a watercraft, particularly an oil-spill clean-up vehicle, esp. tankers. Such an arrangement could include, e.g., 1, 2, 3, 4, 5, 6, 10, 20, 50, 100, 250, 500, 1000, or 2500 filter columns with identical or varied diameters and heights (e.g., 1 m diameter×5 m high, 1.5 m diameter×5 m high, 2.5 m diameter×5 m high, or the like), or the vessel could contain 104, 105 relatively small filters, e.g, in a range of 5 to 50 cm diameter×10 to 250 cm high. These filters could separate oil out onto the vessel (or a container ship or tanker), and/or expel the purified water into the water body from which the oil-water mixture or emulsion is extracted.

Aspects of the invention provide methods of making the membrane in any permutation described herein, the method comprising: feeding a mixture of polyacrylonitrile, silica nanoparticles, and graphene oxide in a solvent through a feed syringe to obtain a fiber; and forming the fiber into a film. Aspects of the invention provide methods of separating oil from an oil-water mixture or emulsion comprising: contacting the emulsion with one of more membranes in any permutation described herein; and separating at least part of the oil from the mixture or emulsion.

Aspects of the invention provide methods of making a hybrid membrane suitable for filtering a oil-water mixture, the method comprising: dissolving polyacrylonitrile in a solvent to form a solution; adding to the solution silica nanopowder with an average particle size in a range 5 to 20, 7.5 to 17.5, 10 to 15, 11 to 14, or 11.5 to 13 nm; adding graphene oxide flakes having a length and/or width in a range of from 100 to 900, 200 to 800, 300 to 700, 350 to 650, or 400 to 500 nm; stirring the solution for a time in a range of 6 to 18 8 to 16, 10 to 14, 11 to 13, or 12 hours; and electrospinning the solution at a voltage in a range of 10 to 30, 12.5 to 28, 15 to 26, 17.5 to 24, 18 to 22, 19 to 21, or 20 kV to form the membrane. The dissolving of the polymer may be carried out with an ultrasonicator, or rapid stirring, or other intense agitation. The forming of the fiber may include passing the solution through a syringe, and/or through a spinneret. The thread of doped fiber may be fed onto a collector and/or hot pressed at no more than 200, 180, 160, 150, or 140° C., to form a mat.

Relevant solvents for the dissolving of the polymer may include dimethylformamide (DMF), dimethylsulfoxide (DMSO), acetonitrile, tetrahydrofuran (THF), hexamethylphosphoramide (HMPA), n-butanol, or the like. The manufacturing method preferably avoids a carbonization step, and preferably avoids temperatures of at least 600, 500, 400, 350, 325, 300, 275, 250, 225, or 200° C. The solvent may be selected to swell the polymer and/or introduce the graphene into the polymer chain.

Membranes within the scope of the invention may contain no (over)coating upon the fibers, or no more than 33, 20, 15, 10, 7.5, 5, 4, 3, 2, 1, 0.5, 0.1, 0.01, or 0.001 wt. %, relative to any coating weight and/or membrane weight, of fluorine-containing polymers, more than 33, 20, 15, 10, 7.5, 5, 4, 3, 2, 1, 0.5, 0.1, 0.01, or 0.001 wt. % of silicon-containing polymers, and/or more than 33, 20, 15, 10, 7.5, 5, 4, 3, 2, 1, 0.5, 0.1, 0.01, or 0.001 wt. % of sulfur-containing polymers, particularly no more than 33, 20, 15, 10, 7.5, 5, 4, 3, 2, 1, 0.5, 0.1, 0.01, or 0.001 wt. % polydimethylsiloxane (PDMS), tetra(m)ethoxysilane, and/or 3-aminopropyltriethoxysilane (APTES).

In regard to additives, such as fillers, inventive membranes may avoid additives, particularly fillers, beyond graphene oxide and silica altogether, or may contain no more than 10, 8, 7.5, 7, 6, 5, 4, 3, 2.5, 2, 1, 0.5, or 0.1 wt. % additives, particularly fillers, beyond graphene oxide and/or silica, particularly unmodified silica. Specifically, inventive membranes may contain no more than 10, 8, 7.5, 7, 6, 5, 4, 3, 2.5, 2, 1, 0.5, or 0.1 wt. % dopamine and/or iron, particularly $Fe(NO_3)$, and/or platinum and/or cobalt. Inventive membranes may contain no more than 10, 8, 7.5, 7, 6, 5, 4, 3, 2.5, 2, 1, 0.5, or 0.1 wt. % catalytic metals. Inventive membranes may contain no more than 10, 8, 7.5, 7, 6, 5, 4, 3, 2.5, 2, 1, 0.5, or 0.1 wt. % non-noble metals. Generally, membranes within the scope of the invention need not, but may nonetheless, have electrocatalytic activity and/or electrode activity.

Inventive membranes may avoid carbon nanotubes altogether, or contain no more than 10, 8, 7.5, 7, 6, 5, 4, 3, 2.5, 2, 1, or 0.5 wt. % carbon nanotubes, and/or no more than 10, 8, 7.5, 7, 6, 5, 4, 3, 2.5, 2, 1, or 0.5 wt. % carbon nanospheres. Inventive membranes generally comprise graphene oxide which is at least 90, 92.5, 95, 97.5, 98, 99, 99.5, 99.9, 99.95, or 99.99 wt. %, or even all detectable amounts, relative to other carbon-based fillers, in the form of flakes (which are considered synonymous with plates, i.e., planar shapes with relatively small height compared to length and/or width).

EXAMPLE

Materials: polyacrylonitrile (PAN) with weight-average molecular weight ($M_w$) of 150,000 g/mol and N,N-dimethylformamide (DMF, 99.8%) were purchased from Sigma Aldrich (USA) to prepare the electrospinning solution. Silica nanopowder ($SiO_2$) with average particle size of 12 nm was purchased from Sigma Aldrich (USA) while graphene oxide (GO) with flake size in the range of 0.3 to 0.7 microns with carbon/oxygen ratio of 4:1 was purchased from Graphene Supermarket (USA). All chemicals were used as received without any further pretreatment. Deionized (DI) water was obtained using a Millipore Milli-Q® water purification system for purposes such as rinsing, cleaning, and dilution. Distilled water and lubricating oil from Shell were used for making the oil-water emulsion.

Fabrication of PAN composite and hybrid membrane: Using a using Nanon-01A (MECC Japan) electrospinning setup, PAN, PAN-$SiO_2$, PAN-GO, and PAN-GO-$SiO_2$ membranes were prepared by first dissolving desired amounts of PAN in dimethyl formamide (DMF) with magnetic stirring for 24 hours at 60° C. Silica and/or graphene oxide were then separately dispersed in DMF with the aid of ultrasonication for 6 hours. Resulting dispersions were then mixed in the previously prepared PAN solutions with magnetic stirring for 12 hours, to obtain a homogeneous solution of PAN-$SiO_2$, PAN-GO, and PAN-GO-$SiO_2$. The resulting solution compositions are labeled in Table 1 below.

TABLE 1

Electrospinning doped composition
of composite and hybrid membranes

| Sample label | Composition |
| --- | --- |
| PAN | Pristine PAN |
| PAN-4$SiO_2$ | PAN + 4 wt. % $SiO_2$ |
| PAN-7.5$SiO_2$ | PAN + 7.5 wt. % $SiO_2$ |
| PAN-0.5GO | PAN + 0.5 wt. % GO |
| PAN-1.5GO | PAN + 1.5 wt. % GO |
| PAN-1.5GO-7.5$SiO_2$ | PAN + 1.5 wt % GO + 7.5 wt. % $SiO_2$ |

The doped, stable solutions in Table 1, containing different ratios of nanofillers, were electrospun at a voltage of 20 kV. The other process parameters such as feed rate, spinneret to collector distance, collector rotation, spinneret speed, needle size, and temperature were kept constant at 1.0 mL/h, 15 cm, 300 rpm, 70 mm/s, 21 G, and 25° C., respectively.

Aluminum foil was wrapped around the drum collector to ease the removal of electrospun mats. A schematic of the electrospinning process is shown in FIG. 1. After electrospinning, mats were removed carefully from the collector and dried in conventional oven at 80° C. for 12 hours to completely remove the solvent from the electrospun mats. These mats were then hot pressed at 140° C. for 2 minutes using a household electric iron at hand held pressure of approximately 3 kPa to obtain mechanically robust and dimensionally uniform membranes.

The morphology of the electrospun nanofibers, prepared according to the Example, was examined using a LYRA-3® high resolution, dual beam field emission scanning electron microscope (FE-SEM) manufactured by TESCAN, of the Czech Republic. Prior to examination, the membrane samples were sputter coated with gold for 40 seconds using a JFC-1100® ion coater (JEOL, USA) to mitigate charging associated with non-conductive materials. The surface morphology of individual electrospun nanofiber was studied by collecting them on 150 mesh copper grids and examining them using a JEM-2100F® Transmission Electron Microscope (TEM) manufactured by JEOL (USA). Fourier Transform Infrared Spectroscopy (FT-IR) with a Nicolet 6700® instrument manufactured by Thermo Scientific (USA) was used, to characterize the functional groups in both pure PAN and PAN-based hybrid membranes. An overall spectrum range of 4000-600 $cm^{-1}$ was explored in the transmittance mode.

The membranes prepared according to the Example were analyzed for surface wetting behavior by contact angle measurements under sessile drop method using a DM-501 optical contact angle measurement goniometer from Kyowa Interface Science Co., Ltd (Japan). Water contact angles and underwater oil contact angles were measured for each membrane. The pore size of the fabricated membranes was determined by the expulsion of liquid through gas pressure using a Quantachrome Instruments capillary flow porometer (3 GHz, USA) capable of measuring pore sizes from 500 µm down to 30 nm. Porosity of the membranes were determined by using the density of the electrospun membrane and bulk density of the precursor powder according to Equation 1, below.

$$P\% = 1 - \frac{\rho_e}{\rho_p} * 100. \qquad \text{Eq. 1}$$

In Eq. 1, P % is the percentage porosity, $\rho_e$ is the density of the electrospun membrane, and $\rho_p$ is the bulk density of the precursor powder. For porosity calculations, the membrane density was evaluated by first determining the total volume of the membrane by dimensional measurements of membrane length, width, and thickness using a ruler and a Mitutoyo (Japan) Litematic VL-50® low force (0.01 N) digital measuring system, followed by measuring the weight of the membrane samples. Tensile strengths of the membrane samples were determined using ElectroForce 3200 test instrument with a 225N load cell at a constant strain rate of 0.08 mm/sec. The tensile test samples were cut with a die in accordance with ASTM D 1822.

Oil-Water Separation Tests

Figure 6A:
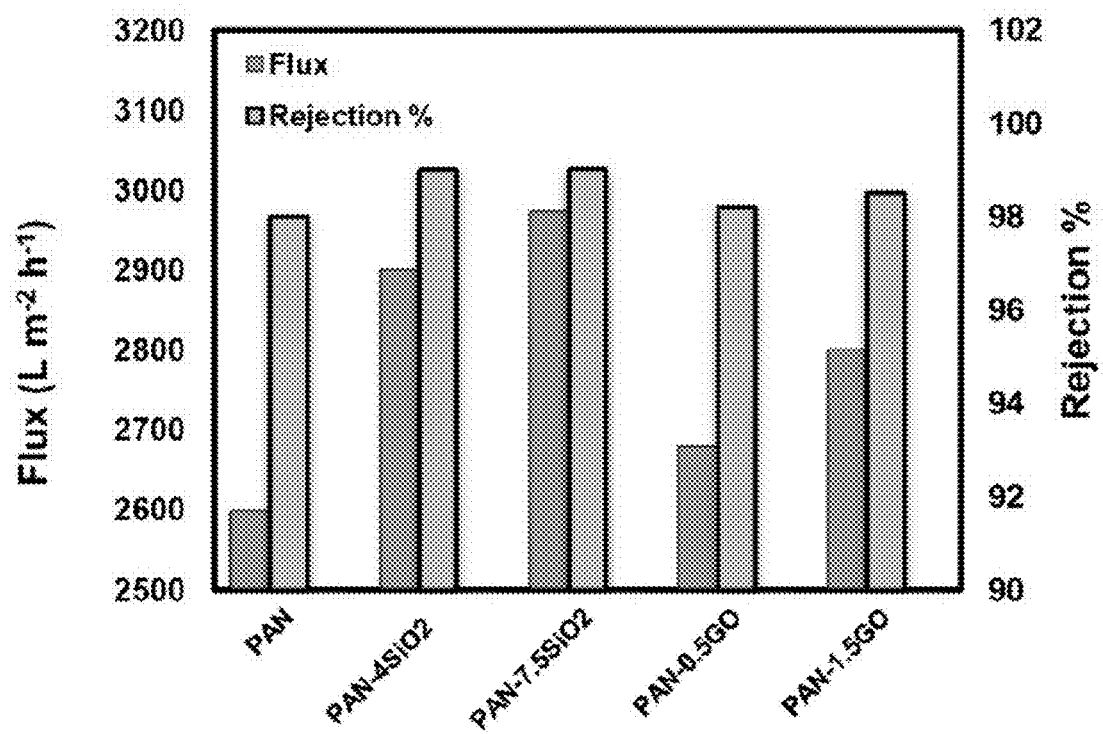
FIG. 6A-D show a) flux and rejection % of permeate for a PAN (hybrid) membrane with different nano-fillers, b) flux for the permeate of a PAN-7.5SiO$_2$-1.5GO hybrid membranes according to the invention over 5 consecutive cycles, c) a digital image of emulsion, prior to filtration, showing oil droplets, and d) a digital image of permeate through an inventive hybrid membrane showing no oil droplets.
Figure 6B:
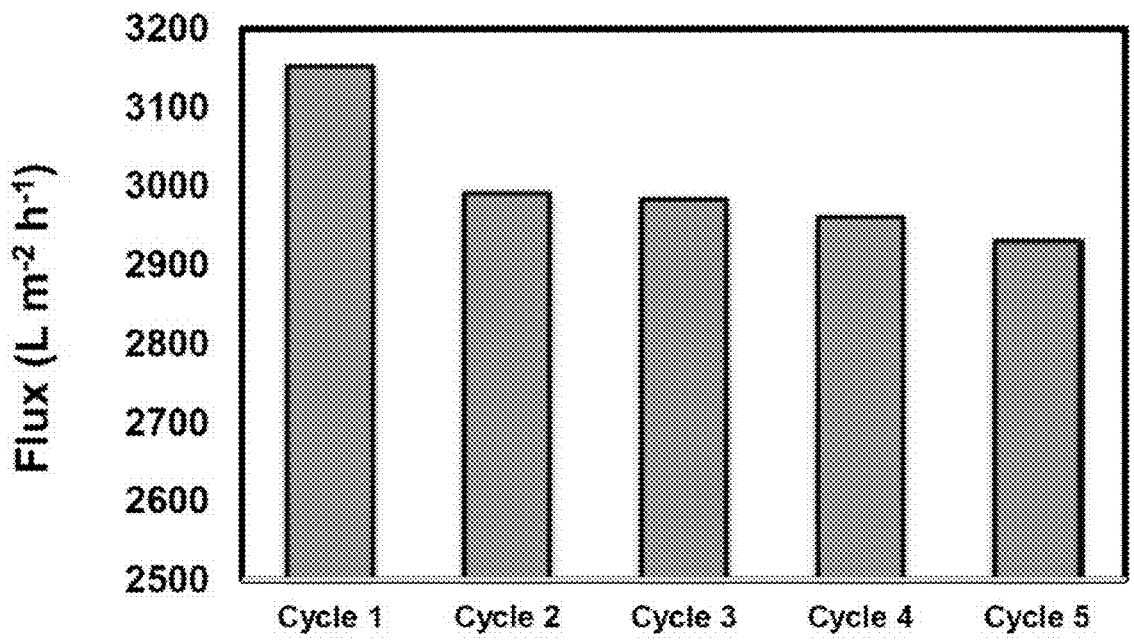
Figure 6C:
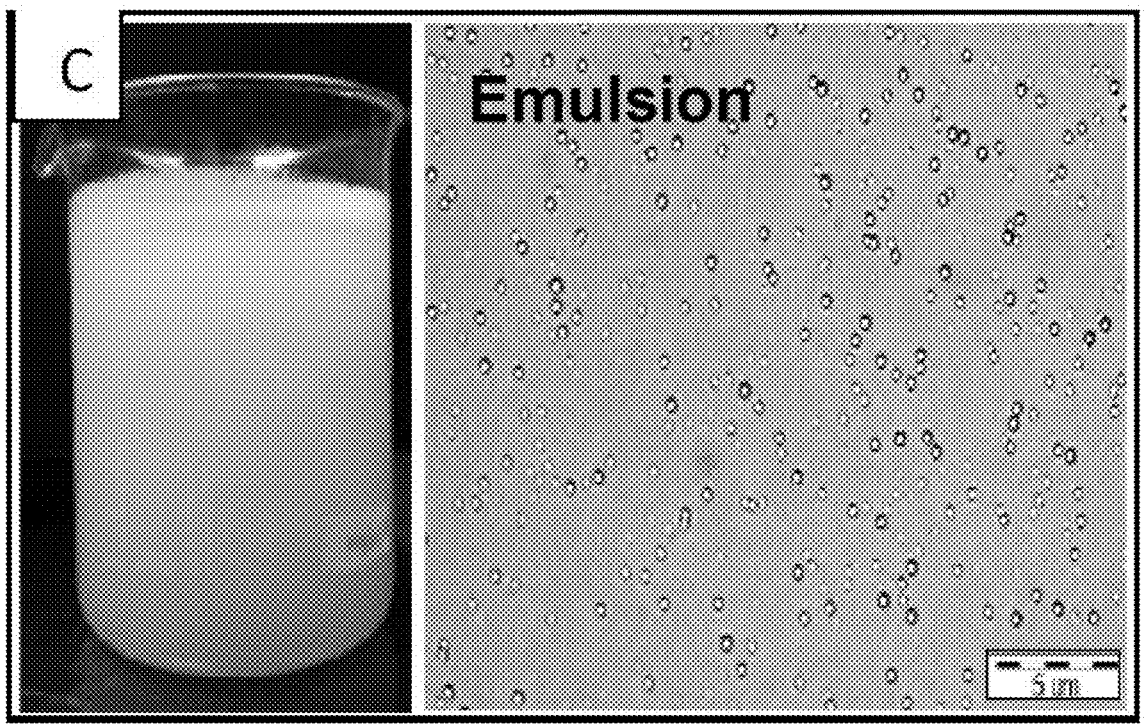

To evaluate the oil and water separation behavior of the membranes prepared according to the Example, an oil in water emulsion, containing 10% lubricating oil was prepared using 2000 ppm lubricating oil in deionized water using high speed stirring (7000 rpm) for 1 hour. Sodium dodecyl sulfate (SDS) was used as a surfactant. A homogenous stabilized oil-water emulsion was obtained as seen in FIG. 6C. The oil-water separation tests were performed using a simple gravity driven cell including an open-ended beaker and a flask. A constant feed height was maintained throughout the course of experiment such that a pressure of 0.1 bar is exerted due to the height of liquid column under gravity. Each separation test was carried out for at least five cycles, with intermediate rinsing with water and ethanol, to evaluate the membrane re-usability. The permeation flux (F) of the membrane was calculated according to Equation 2, below.

$$F = \frac{V}{A * t}. \qquad \text{Eq. 2}$$

In Eq. 2, V is the total volume of fluid penetrating through the membrane, A is the effective membrane area (here, 20 mm$^2$), and t is the separation test time. After the separation experiment, permeates were evaluated for oil content using a TOC-VCHS total organic carbon analyzer (TOC) from Shimadzu (Kyoto, Japan), and the amount of oil was compared with the original oil content of the feed emulsion to determine the rejection percentage and membrane's separation efficiency. The presence of oil droplets in the permeate was also examined by optical observations.

Referring now to the drawings, wherein like reference numerals designate identical or corresponding parts throughout the several views. FIG. 1 shows an exemplary reaction set-up for producing fibers and membranes within the scope of the invention.

Figure 2A:
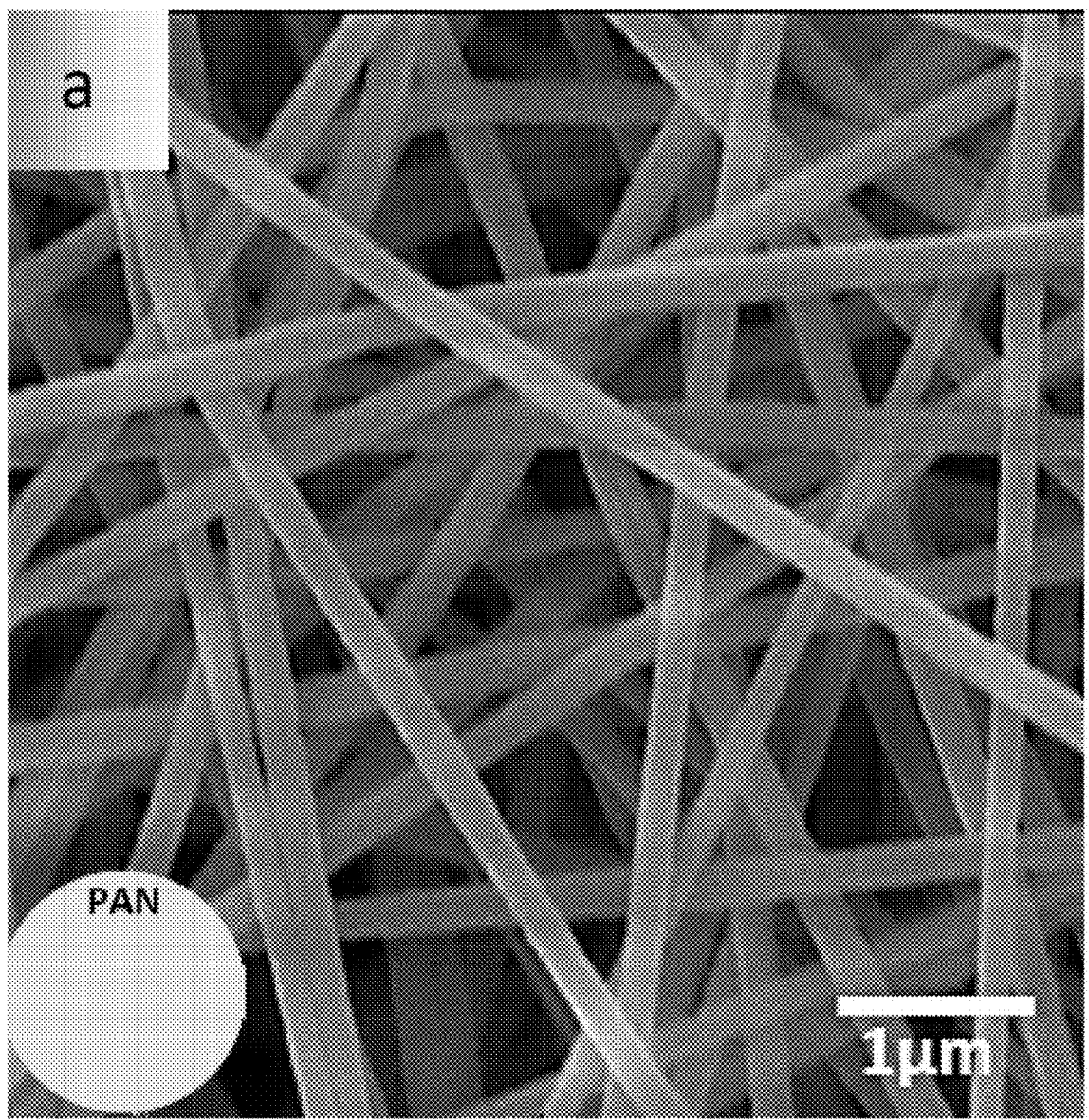
FIG. 2A-E show SEM images of membranes produced according to the Example herein, a) PAN, b) PAN-4SiO$_2$ (i.e., 4 wt. % SiO$_2$), c) PAN-7.5SiO$_2$ (i.e., 7.5 wt. % SiO$_2$), d) PAN-0.5GO (i.e., 0.5 wt. % graphene oxide), and e) PAN-1.5GO (i.e., 1.5 wt. % graphene oxide), with insets showing digital images of the electrospun membranes (area=20 μm$^2$) used for the separation test.
Figure 2B:
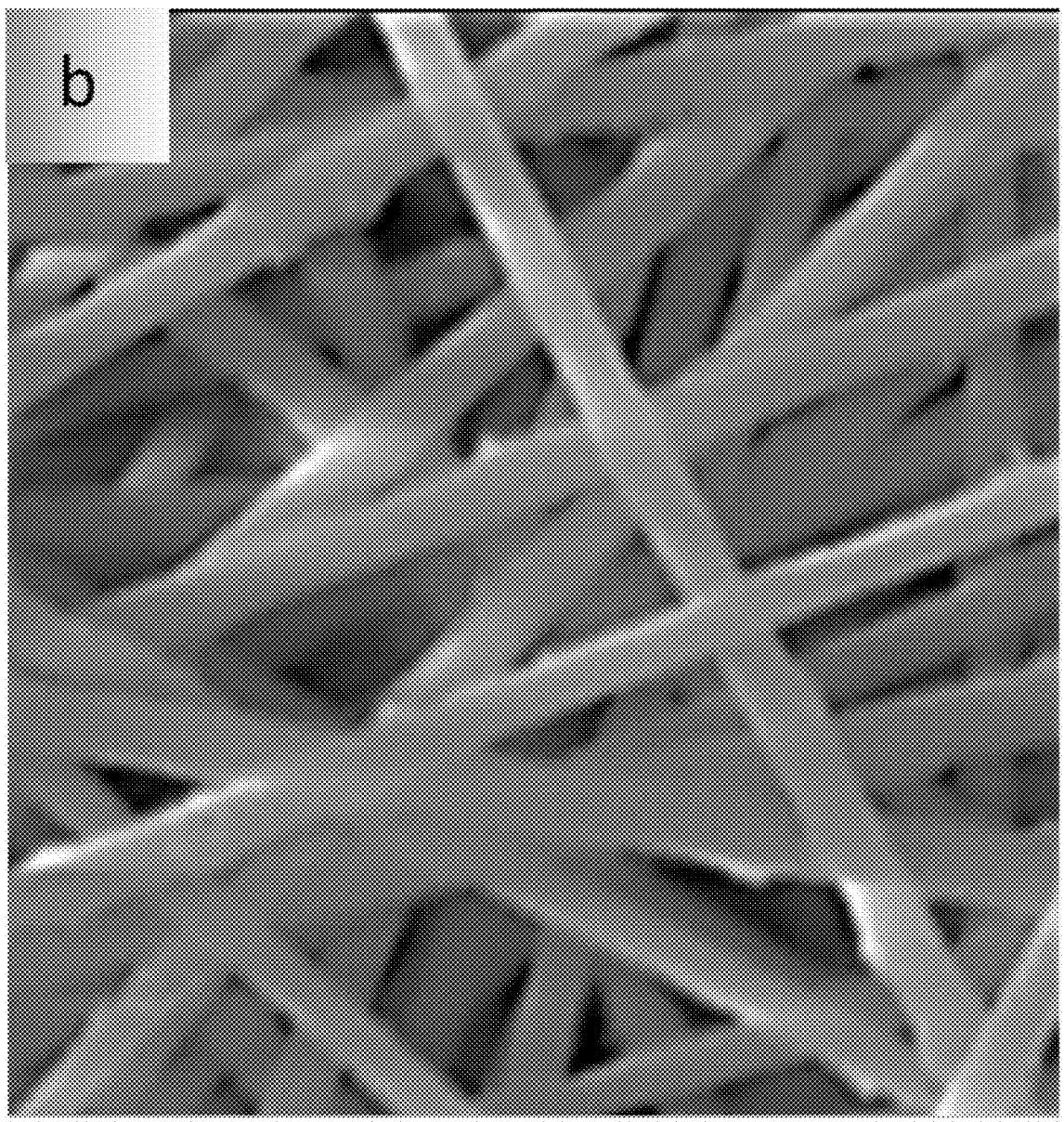
Figure 2C:
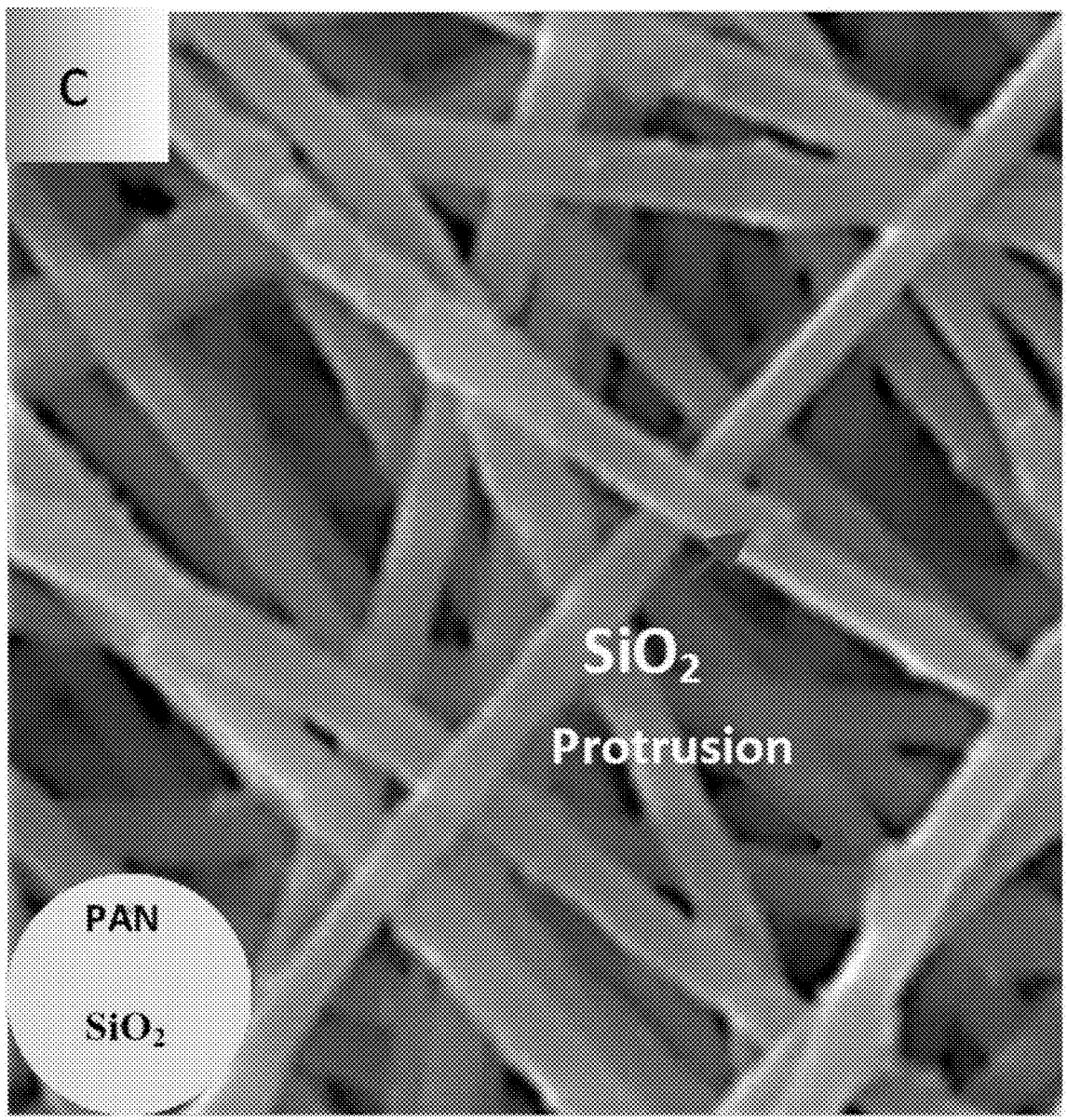
Figure 2D:
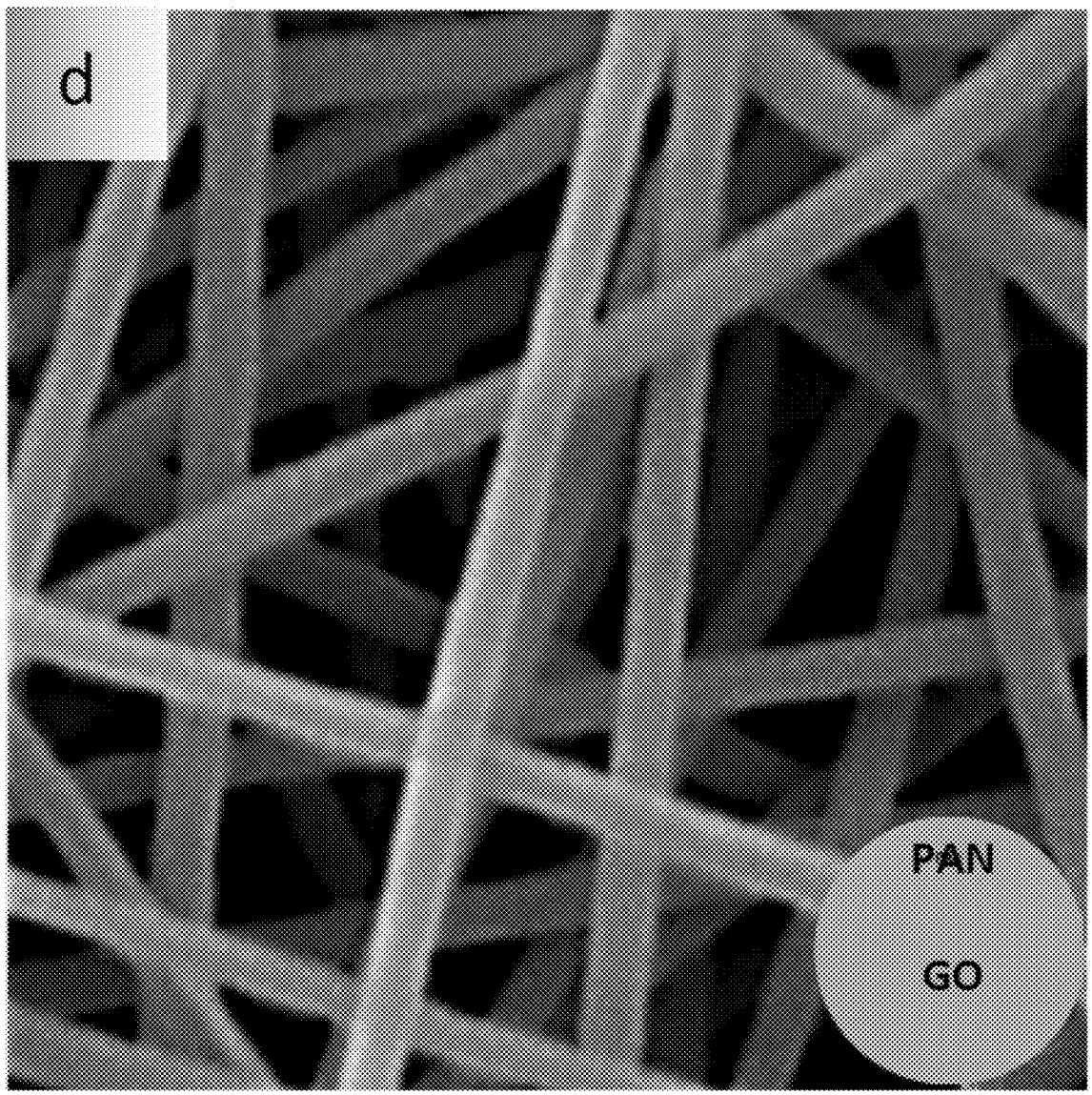

FIG. 2A to E show FE-SEM images of the pure PAN, PAN-GO and PAN-SiO$_2$ membranes prepared according to the Example. The appearance of the membranes after adding inorganic nanofillers was analyzed by scanning electron microscopy, and changes could be clearly observed in FIG. 2. The whitish colored pristine PAN based membrane becoming grayish with the addition of GO, as seen in FIGS. 2D and E indicates uniform distribution of GO in the polymer solution. The addition of SiO$_2$, seen in FIGS. 2B and C, did not produce any observable change in membrane appearance and the polymer remained whitish in color due to whitish color of silica particles.

The images in FIG. 2A to E show that uniform/smooth PAN fibers transform to irregular/rough fibers with the addition of nanofillers. All the membranes exhibited entangled randomly oriented fibers forming a highly porous 3D non-woven structure. This 3D microporous structure can be tailored to offer low resistance to mass transfer and permits high liquid permeation through the membranes.

FIG. 4 illustrates how the surface morphology of fibers were changed with the simultaneous addition of silica nanoparticles and submicron graphene oxide flakes. At low concentrations, most of the silica particles are embedded within PAN fibers. The SEM images show that with increase in the concentration, silica particles tend to protrude at the fibrous surface thus creating a more rough surface. The formation of multi-level protrusions with increased SiO$_2$ content can be attributed to varying degrees of evaporation of the solution jet followed by rapid phase separation during the electrospinning process.

Figure 4A:
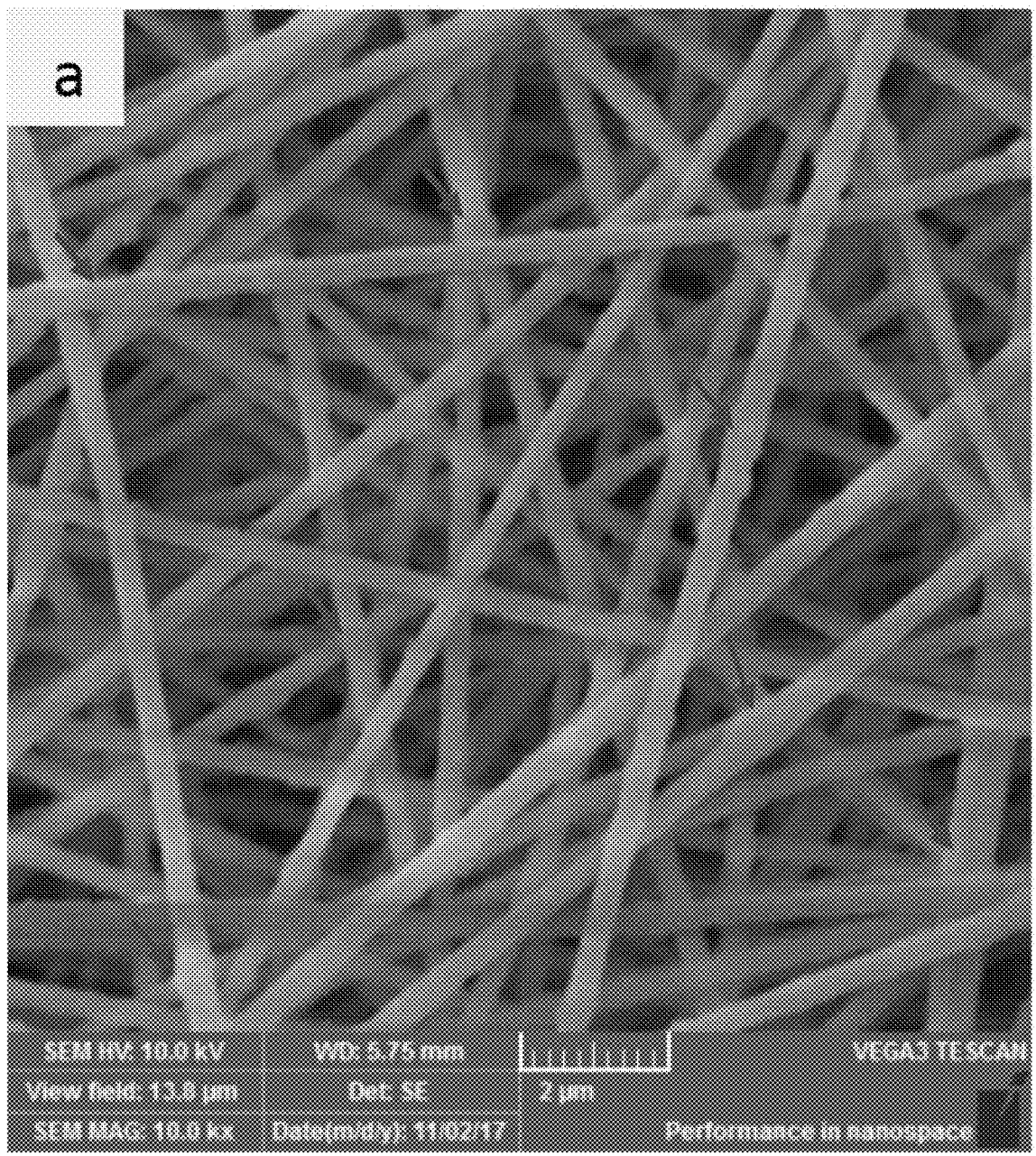
FIG. 4A-C show a) an SEM image of PAN-7.5SiO$_2$-1.5GO hybrid membrane, b) a TEM image of the hybrid membrane, and c) a higher magnification TEM image showing nano-fillers in the hybrid membrane.
Figure 4B:
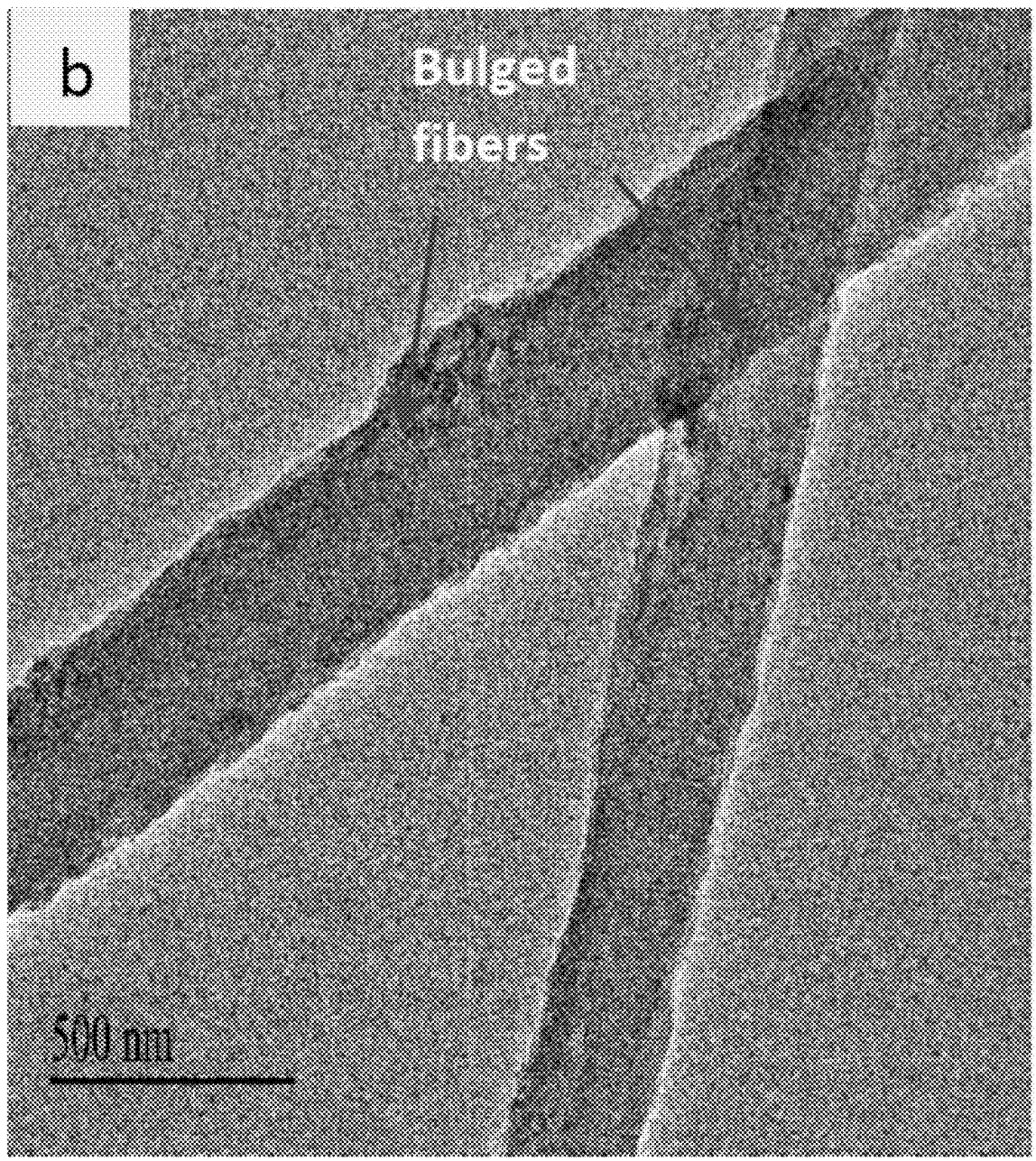

As observed in FIG. 4B that nanofillers addition create fibers with thicker diameter which could be due to the increase in the solution viscosity with increase in silica concentration. The higher viscosity of the electrospinning doped solution reduces the stretching of fibers during electrospinning and results in the formation of thicker fibers, confirms reports by other researchers. Most, i.e., at least 50, 65, 75, 85, 90, 95, 97.5, 98, 99, 99.5%, or even all observable, graphene oxide is embedded within the PAN fibers, which indicates high compatibility between the PAN polymer and the GO filler.

SEM images in FIGS. 2 and 4 indicate the existence of localized fiber swelling and fiber knotting. The emergence of localized fiber swelling and fiber knotting with GO addition may be due to the size mismatch between the sub-micron GO flakes and the PAN nanofibers. Similar fiber morphologies are known from other research wherein high interaction between PAN and GO can cause PAN molecules to adhere onto large GO sheets, forming swelled fibers or ellipsoids. In PAN hybrid fibers comprising PAN, GO, and SiO$_2$, similar fiber morphologies are observed in the SEM images in FIG. 4. The combination of nanoscale silica and micro-nano-scale graphene oxide can cause the appearance of localized nanoprotrusions and swollen fibers as seen in FIG. 4A. The fibers bulge due to the presence of silica and graphene oxide together, consequently increasing the fiber size.

Figure 3:
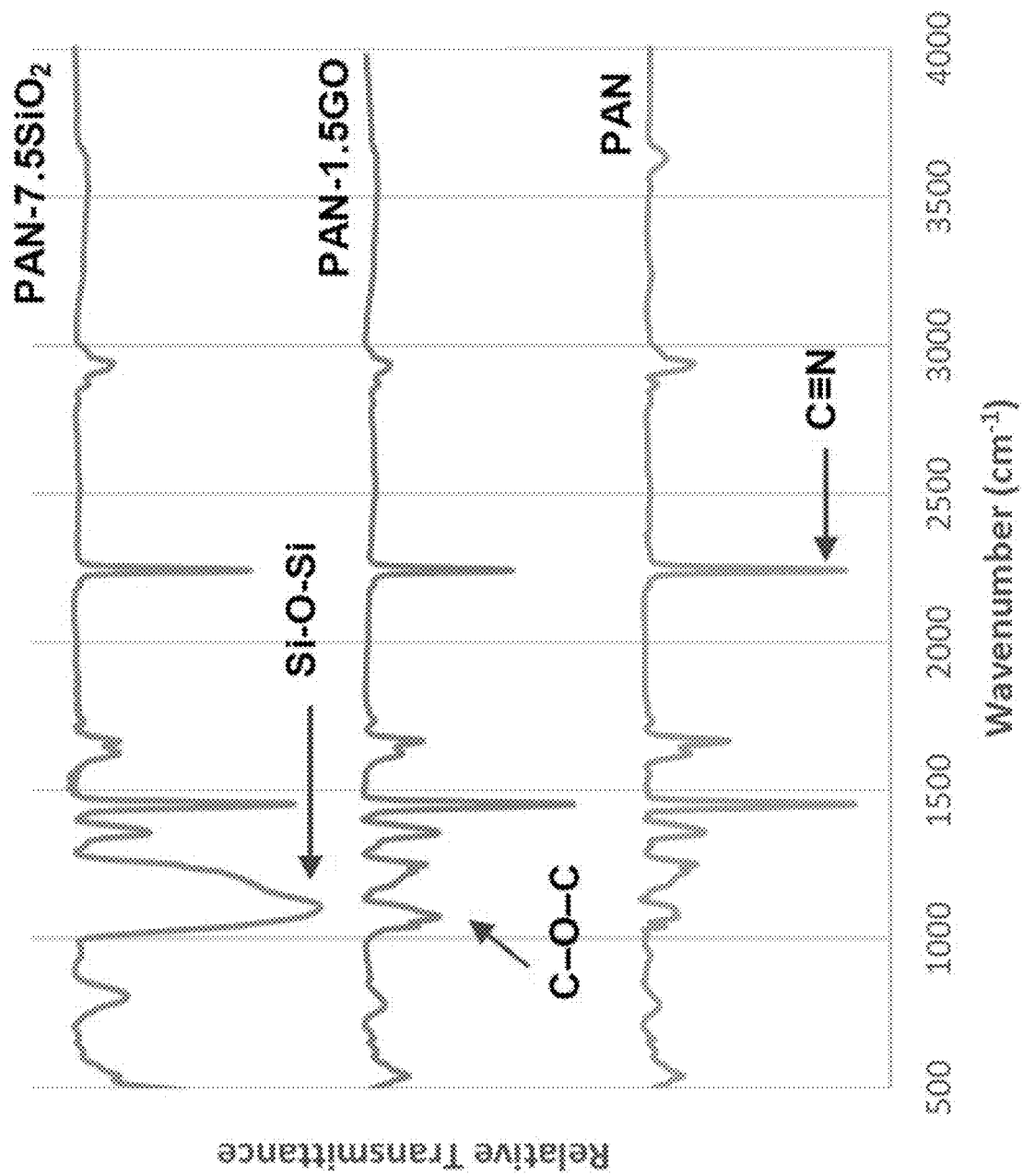
FIG. 3 shows FT-IR spectra of membranes of pure PAN, PAN-GO, and PAN-SiO$_2$.

The surface chemical composition of membranes prepared according to the Example can be investigated by FT-IR spectroscopy, as shown in FIG. 3, which illustrates FT-IR spectra of pure PAN and PAN with nanofillers. The spectra of these materials showed a characteristic nitrile group peaks around 2242 cm$^{-1}$, indicating the presence of PAN. Peaks from 2800-2950 cm$^{-1}$ corresponds to C—H and —CH$_2$— vibrations. FIG. 3 show a peak for PAN-SiO$_2$ composite membranes near 1100 cm$^{-1}$ attributed to Si—O—Si stretching vibrations, while the broad band appeared near 3390 cm$^{-1}$ can be assigned to O—H vibrations of silica. Comparing the spectra of PAN-GO with that of pure PAN, it can be observed that no new characteristic peaks can be immediately attributed to the addition of graphene oxide, the existence of which is indicated by increased peak intensity at 1731 cm$^{-1}$ attributed to C=O vibration of graphene oxide. The failure of graphene oxide doping to manifest in new IR peaks may relate to graphene oxide causing no change the chemical structure of PAN, or substantial embedding into the PAN to mask graphene oxide peaks, or that graphene oxide bonds within the polymer chains with good compatibility to PAN.

Figure 4C:
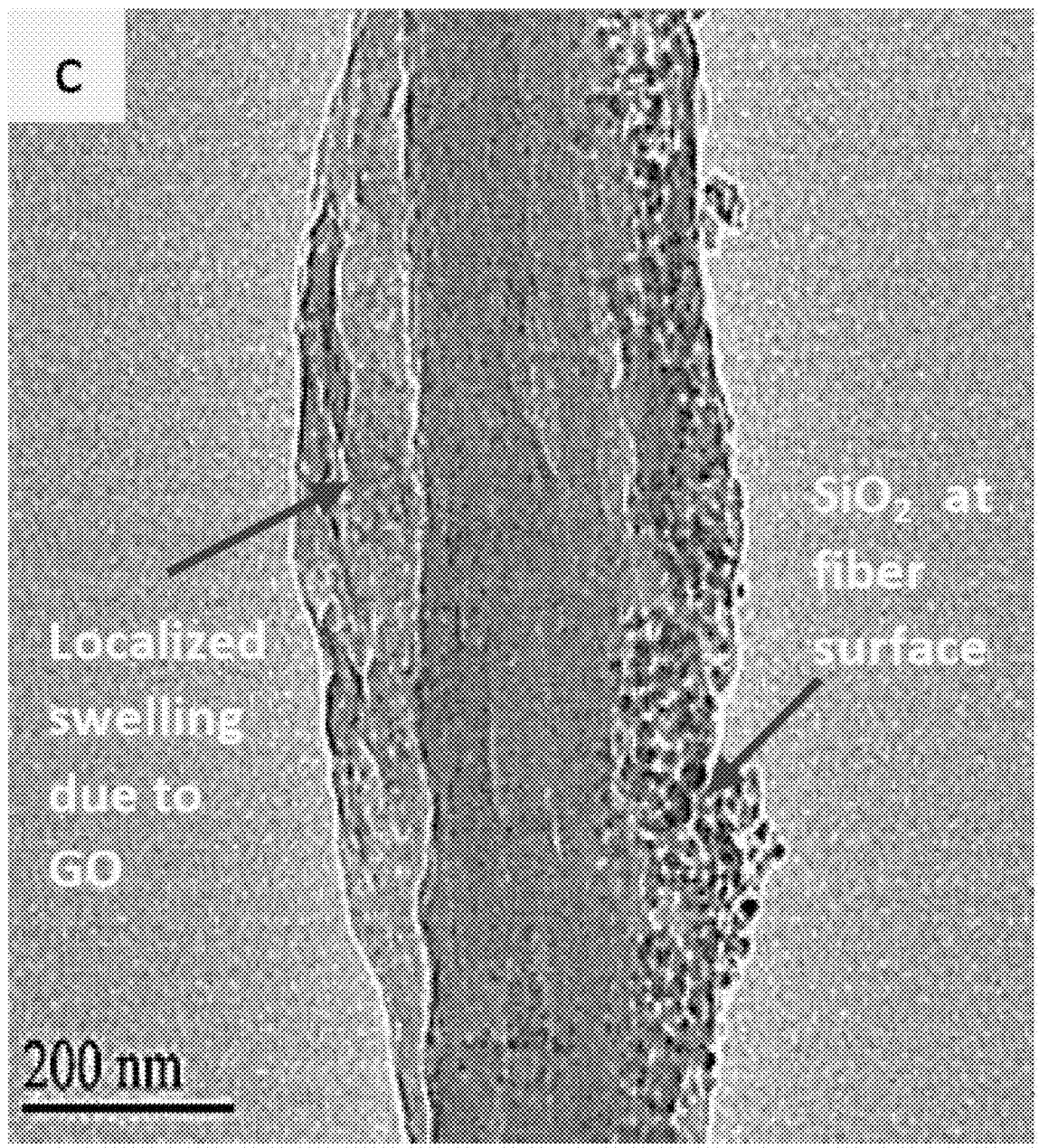

In reference to FIG. 4, transmission electron microscopy (TEM) analysis of hybrid membranes obtained according to the Example was carried out to examine the morphology of individual fibers and to analyze the hybrid formation. FIGS. 4B and 4C show lower and higher magnification TEM images of hybrid PAN-GO-SiO$_2$ membrane, respectively. The TEM images depict non-uniform brightness at the swelled region compared to the smooth regions of the fiber. This appearance of dark and bright regions at the swelled or spindle knotted region indicates the existence of graphene oxide flakes or sheets as a skeleton within the fibrous network, arising due to differences in electron density. In addition, nano-level dark spots can be also observed, which could be silica particles protruding at the surface. Highly magnified TEM images also reveal the agglomeration of nano-sized additives, which agglomeration could be due to rapid evaporation of solvent, e.g., DMF, in electrospinning.

Pore size and porosity of a membrane can play a role in the separation performance of membranes. Table 2, below, lists the some of the important properties for membranes prepared according to the example, such as fiber diameter, porosity %, membrane thickness, and average pore size.

TABLE 2

Characteristics of membranes from the Example

| Membrane | Fiber diameter (nm) | Porosity (%) | Membrane thickness (μm) | Average pore size (μm) |
|---|---|---|---|---|
| PAN | 220 | 85 | 100 | 1.45 |
| PAN-4SiO$_2$ | 300 | 87 | 105 | 1 |
| PAN-7.5SiO$_2$ | 310 | 85 | 107 | 1.05 |
| PAN-0.5GO | 307 | 85 | 96 | 0.95 |
| PAN-1.5GO | 290 | 86 | 84 | 1.2 |
| PAN-7.5SiO$_2$-1.5GO | 350 | 88 | 110 | 1.3 |

All membranes in Table 2 were observed to have pores ranging from 0.8-1.5 μm. No significant change in pore size was observed after addition of nanofillers. Such membranes would be expected to treat the emulsions having oil droplet sizes of 1.5 μm or higher and in oil-in-water emulsions. The membranes in Table 2 also showed high porosity, i.e., at least 50, 65, 75, 80, or 85%, mainly due to the electrospinning process, which has been reported to produce porous membranes under proper conditions. Table 2 shows that the electrospun PAN-based membranes have the average porosity of 85%. The highest porosity, 88%, was obtained for the PAN hybrid membrane with 1.5 wt. % GO and 7.5 wt. % SiO$_2$. High porosity values with interconnected 3D structure and approx. 1 μm pore size (e.g., 100 nm to 10 μm, 500 nm to 5 μm, 800 nm to 3 μm, 850 nm to 2 μm, 900 nm to 1.5 μm, or 950 nm to 1.25 μm) can provide advantageous separation characteristics such as high permeability at low operating pressures. The average fiber diameter of PAN generally increased with the addition of nanofillers, though increasing graphene oxide content from 0.5 to 1.5 resulted in reduced fiber and membrane diameter. The increase in diameter may be due to an increase in viscosity of the solution as nanofillers are dispersed in PAN solution.

Figure 5A:
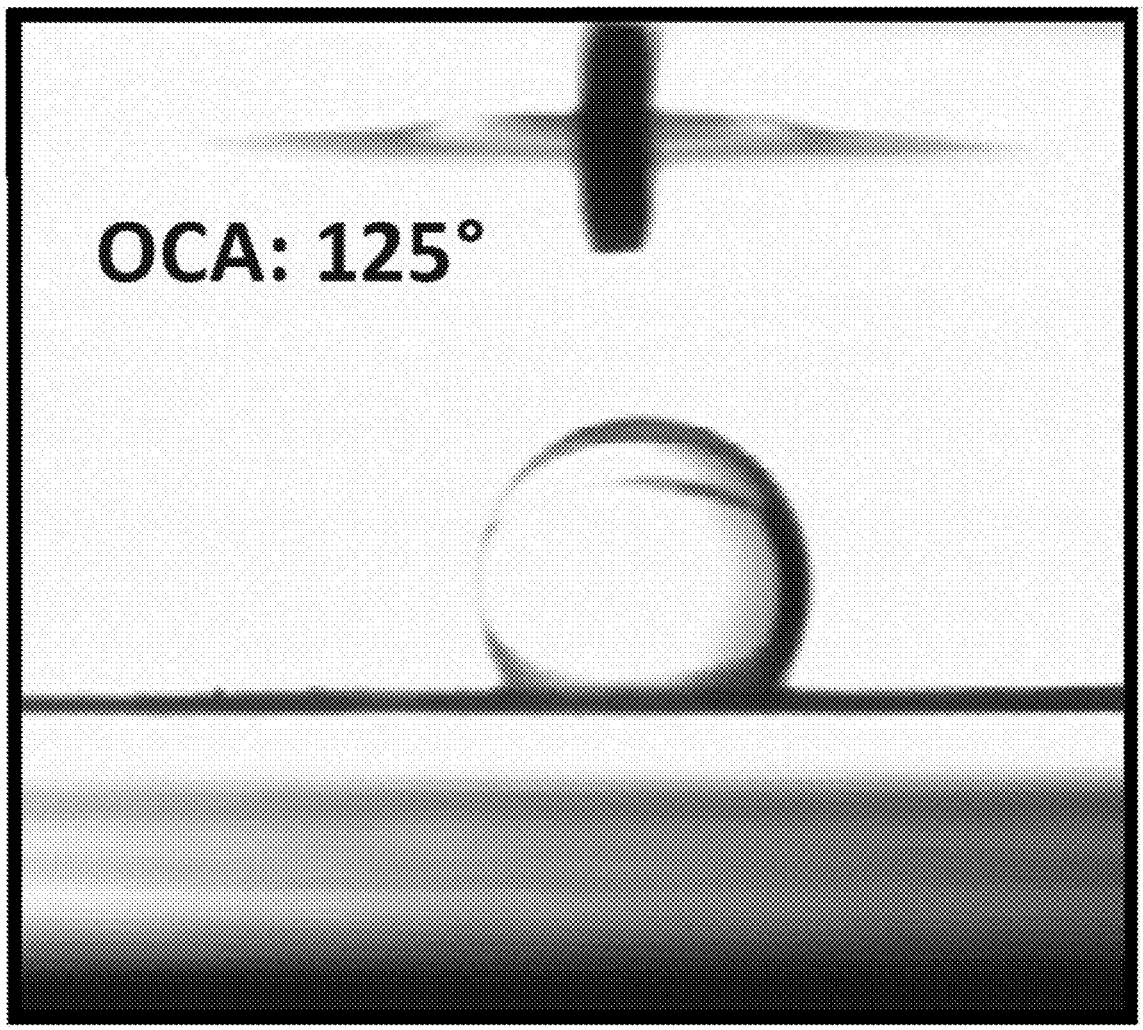
FIG. 5A-B shows underwater oil contact angles for a) a pure PAN membrane, and b) a PAN hybrid membrane according to the invention.

The contact angle of water and oil in water was investigated in FIG. 5 for the membranes prepared according to the Example to evaluate their wetting behavior. The pure PAN membrane was inherently hydrophilic with a water contact angle of 15° and underwater oil-contact angle of 125°, as seen in FIG. 5A. The underwater oil contact angle increased with the addition of inorganic nanofillers. PAN membrane with 0.5 wt. % graphene oxide showed an increased oil contact angle up to 143°. A content of 1.5 wt. % graphene oxide resulted in a 160° underwater oil contact angle combined with a water contact angle of 9°. These surface characteristics indicate a hierarchical structure from introducing graphene oxide improves water affinity and superoleophobicity of the membrane as seen in other studies. Similar trends were observed for membranes including silica nano-fillers. The results of these tests are set forth in Table 3 below.

TABLE 3

Water contact angle (WCA) & underwater oil contact angle (OCA)

| Membrane | PAN | PAN-4SiO$_2$ | PAN-7.5SiO$_2$ | PAN-0.5GO | PAN-1.5GO |
|---|---|---|---|---|---|
| WCA | 15° | 12° | 10° | 10° | 9° |
| OCA | 125° | 145° | 150° | 143° | 160° |

Figure 5B:
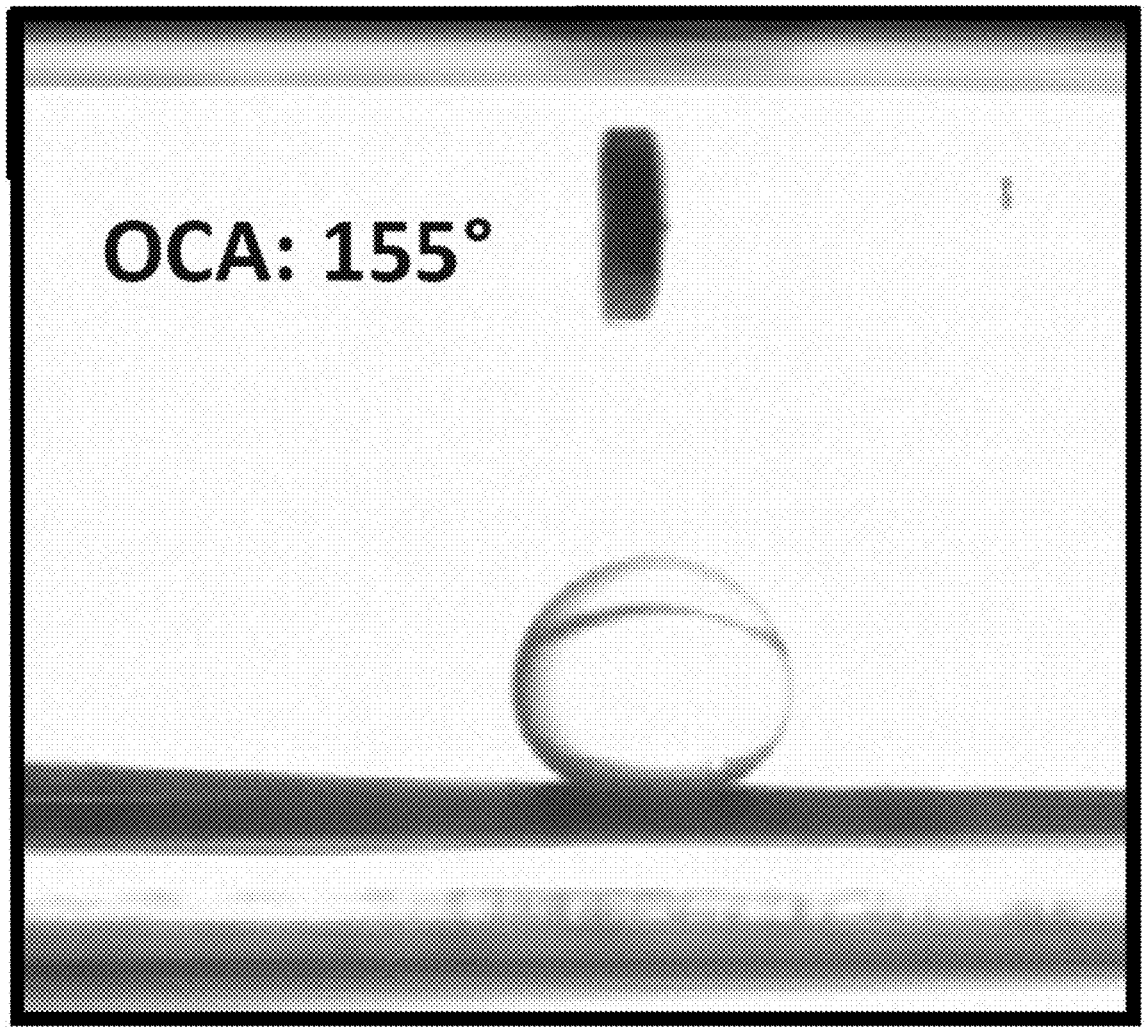

High underwater contact angles for oil may come from a surface hierarchical structure comprising micro-nano features in the case of silica, causing the water to sit inside individual fibers and form a triple phase oil-water-solid condition. The sitting water reduces the contact area of oil and causes the oil to roll off the surface. Addition of silica alone and in combination with graphene oxide showed improved hydrophilic-oleophobicity, as seen in FIG. 5B, likely due to the additional hydrophilic functionalities.

Table 4 highlights the tensile behavior of the developed PAN membranes including the composite and hybrid, which can play a role in reusability, handling, and anti-deformation capacity. The initial tensile strength of pure PAN electrospun membrane was 6.4 MPa. Addition of nanofillers reduced the tensile strength of PAN except for 0.5 wt. % graphene oxide, likely due to aggregation of particles at higher concentrations disturbing the polymer chain interactions. The ductility of composites improved from 17% for pure PAN to around 26 wt. % for 0.5 wt. % graphene oxide, 1.5 wt. % graphene oxide, 4 wt. % SiO$_2$, and 7.5 wt. % SiO$_2$. This increase in ductility of membrane may be due to increased fiber diameter after addition of nano-fillers.

TABLE 4

Mechanical properties of Example membranes with nanofillers

| Membrane | Tensile Strength (MPa) | Elongation % | Elastic Modulus (MPa) |
|---|---|---|---|
| PAN | 6.4 ± 0.09 | 17 ± 0.8 | 108 ± 1.5 |
| PAN-7.5SiO$_2$ | 4.6 ± 0.14 | 25.1 ± 1.3 | 77 ± 4.6 |
| PAN-4SiO$_2$ | 4.9 ± 0.04 | 26 ± 1.4 | 70 ± 5.9 |
| PAN-1.5GO | 4.8 ± 0.02 | 26.9 ± 1 | 65 ± 0.9 |
| PAN-0.5GO | 9.1 ± 0.11 | 25.7 ± 3.2 | 98 ± 0.5 |
| PAN-7.5SiO$_2$-1.5GO | 7.8 ± 0.3 | 13.9 ± 1.5 | 128 ± 1.8 |

Adding graphene oxide in small amounts into the PAN solution according to the Example, increases the strength from 6.4 to 9.1 MPa at 0.5 wt. % graphene oxide loading. The tensile strength increase could be because graphene oxide at low concentrations can limit polymer chain disorientations, thus improving the strength and ductility. Hybrid membrane strength was increased by 21% and the membrane was stiffer, i.e., the elastic modulus increased by 18%, which can benefit stability and reusability of membrane.

In reference to FIG. 6, due to high hydrophilicity together with surface hierarchy, membranes according to the invention show a good combination of flux and efficiency more than 98%. A series of PAN-based membranes—PAN, PAN with graphene oxide; PAN with SiO$_2$ and hybrid PAN-graphene oxide —SiO$_2$ electrospun membranes, were tested by fixing them on a dead-end filtration cell. The oil water emulsion was passed through the cell under a pressure of 0.1 bar (liquid column height under gravity). The initially milky feed emulsion, seen in FIG. 6C, turns transparent after passing through the membranes according to the invention, which indicates high separation efficiency. FIG. 6A shows water flux and rejection percentage of oil after the separation test. The pure PAN membrane showed an appreciable water flux of 2600 Lm$^{-2}$h$^{-1}$. As seen in FIG. 6A, flux increased with increasing SiO$_2$ concentration, while flux increased only marginally with graphene oxide relative to pure PAN, which may be due to low concentration of graphene oxide in the membrane. This improvement in flux in the composite membrane may be attributed to fiber morphology changes and increased hydrophilic groups in the polymer chain after adding nano-fillers. The flux of water for the hybrid membrane for 5 repeated cycles is shown in FIG. 6B. The highest flux, 3151 Lm$^{-2}$h$^{-1}$, was achieved in the first cycle of separation for the hybrid membrane. Adding graphene oxide with SiO$_2$ in the hybrid membrane can enhance the effect of adding silica with the increased antifouling characteristics. This antifouling behavior of graphene oxide is indicated by the separation test for 5 repetitions in the hybrid membrane.

Figure 2E:
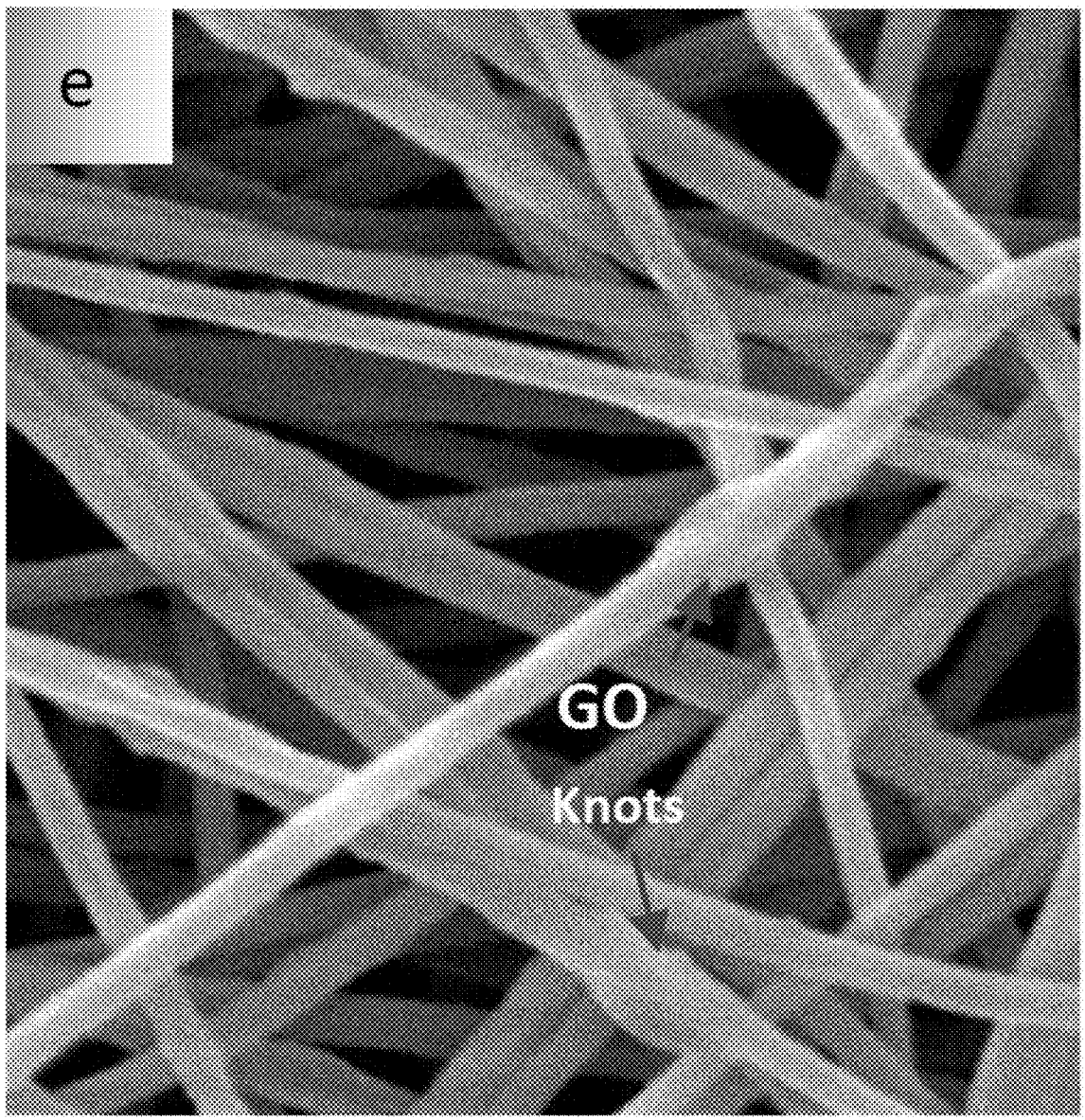
Figure 6D:
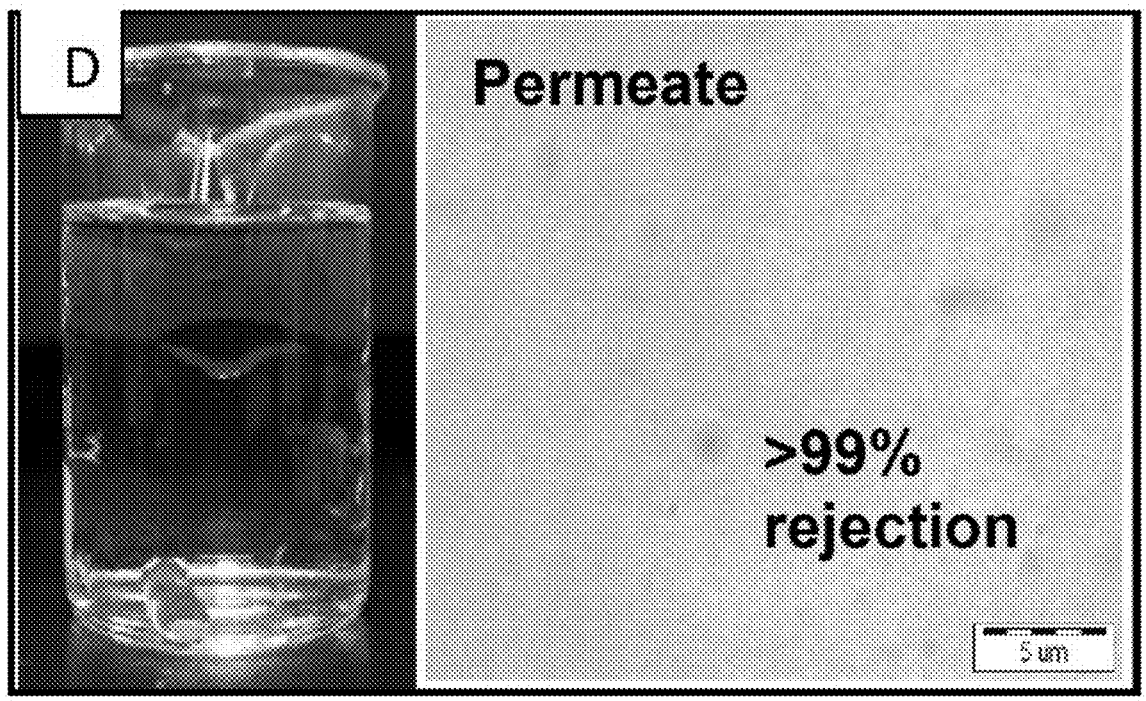

Spindle-knots formed upon incorporation of graphene oxide, seen in FIGS. 2E and 4, can improve fouling resistance. Pure PAN membranes made by the method in the Example have a porous entangled structure and a separation efficiency of 98%. Adding hydrophilic silica and antifouling graphene oxide further enhances the rejection percentage of oil close to 99%. The PAN hybrid membrane achieves a maximum flux of 3151 Lm$^{-2}$h$^{-1}$ with a separation efficiency of more than 99%, as seen in FIG. 6D. The decline in flux after first test, i.e., cycle 1, may be at least in part due to inability of laboratory cleaning operations to remove oil particles from the membrane pores. The flux remained about same later on after cycle 2, indicating a antifouling nature of the membranes. Therefore, proper cleaning can improve flux recovery or cyclic consistency on repetition. The hybrid membrane was easy to handle and can be used multiple times for oil water separation test.

The PAN hybrid membrane with silica and graphene oxide nano-fillers can be successfully fabricated using a one-step electrospinning process. The incorporation of silica nanoparticles causes micro-nano protrusions on the surface of electrospun nano-fibers. The protrusions became more prominent at higher concentrations of silica nano-fillers. The incorporation of graphene oxide resulted in the formation of knots within the smooth fibrous network of PAN, and the frequency of these knots increased at higher graphene oxide contents. Adding graphene oxide and SiO$_2$ in combination, to develop a hybrid membrane, caused a significant increase in the separation performance, likely due to the hierarchical structure of hybrid. The tensile strength of developed membranes was improved by incorporating nano-fillers and reached to a maximum of 9.1 MPa at 0.5 wt. % graphene oxide from initial 6.4 MPa for pure PAN while the strength of hybrid was 7.8 MPa. The flux increased with increased nano-filler concentration, and a maximum of 3151 Lm$^{-2}$h$^{-1}$ from initial 2600 Lm$^{-2}$h$^{-1}$ was found for hybrid membrane with a rejection of more than 99%.

Numerous modifications and variations of the present invention are possible in light of the above teachings. It is therefore to be understood that within the scope of the appended claims, the invention may be practiced otherwise than as specifically described herein.

REFERENCE SIGNS 1 solution preparation
2 HV supply
3 syringe pump
4 feed syringe
5 spinneret
6 fiber formation
7 collector
8 (hot pressed) electrospun mat

The invention claimed is:

1. A membrane, comprising:
an electrospun polyacrylonitrile (PAN) nanofiber;
from 1.5 wt % to 2.5 wt % relative to the total membrane weight of graphene oxide; and
from 7.5 wt % to 10 wt % relative to the total membrane weight of silicon dioxide nanoparticles;
wherein at least a portion of the graphene oxide is in flake form having an average longest dimension in a range of from 50 to 1250 nm,
wherein the graphene oxide is embedded in the PAN nanofibers forming knots, and
wherein the silicon dioxide nanoparticles are on a surface of the PAN nanofibers forming micro-nano protrusions on the nanofiber surface.

2. The membrane of claim 1, wherein the silicon dioxide nanoparticles have an average diameter of from 0.1 to 100 nm.

3. The membrane of claim 1, wherein the graphene oxide flakes have a ratio of thickness to the average longest dimension in a range of from 1:1000 to 1:5.

4. The membrane of claim 1, wherein the graphene oxide has a carbon-to-oxygen ratio in a range of from 10:1 to 2:1.

5. The membrane of claim 1, wherein the PAN nanofiber has a $M_w$ in a range of from 100,000 to 200,000 g/mol.

6. The membrane of claim 1, having a water contact angle of no more than 10° and an underwater oil contact angle of at least 150° C.

7. The membrane of claim 1, having an average pore diameter in a range of from 0.9 to 1.40 μm.

8. The membrane of claim 1, wherein an average fiber diameter of the electrospun polyacrylonitrile (PAN) nanofiber is from 250 to 450 nm.

9. The membrane of claim 1, having:
a tensile strength of from 6.6 to 10.5 MPa;
an elongation at brake of from 10 to 16%;
an elastic modulus of from 110 to 145 MPa; and
a water flux of from 2900 to 3500 Lm$^{-2}$h$^{-1}$.

10. A fluid filter, comprising the membrane of claim 1.

11. A method of separating oil from an oil-water mixture or emulsion comprising:
contacting the mixture or emulsion with the membrane of claim 1; and
separating at least part of the oil from the mixture or emulsion.

12. The membrane of claim 1, wherein a content of the flake form graphene oxide is at least 90 wt % relative to other carbon-based fillers.

13. The membrane of claim 1, wherein a content of the flake form graphene oxide is at least 99.9 wt % relative to other carbon-based fillers.

* * * * *